US012762928B2

(12) United States Patent
McIntosh et al.

(10) Patent No.: US 12,762,928 B2
(45) Date of Patent: Oct. 13, 2026

(54) FUNDING PROGRESSIVE AWARDS USING AUCTION BIDDING SEQUENCES

(71) Applicant: IGT, Las Vegas, NV (US)

(72) Inventors: Jeffery McIntosh, Dieppe (CA); Dwayne Nelson, Las Vegas, NV (US); Anthony Baerlocher, Henderson, NV (US)

(73) Assignee: IGT, Las Vegas, NV (US)

( * ) Notice: Subject to any disclaimer, the term of this patent is extended or adjusted under 35 U.S.C. 154(b) by 188 days.

(21) Appl. No.: 18/222,764

(22) Filed: Jul. 17, 2023

(65) Prior Publication Data

US 2025/0029448 A1 Jan. 23, 2025

(51) Int. Cl.
*G07F 17/32* (2006.01)

(52) U.S. Cl.
CPC ...... *G07F 17/3258* (2013.01); *G07F 17/3262* (2013.01); *G07F 17/3267* (2013.01)

(58) Field of Classification Search
None
See application file for complete search history.

(56) References Cited

U.S. PATENT DOCUMENTS 7,699,697 B2 4/2010 Darrah et al.
7,905,777 B2 * 3/2011 Muir ....................... G07F 17/32 463/25
8,096,874 B2 1/2012 Nicely et al.
8,167,709 B2 * 5/2012 Muir ................... G07F 17/3255 463/25
8,182,338 B2 5/2012 Thomas
8,267,777 B2 9/2012 Jaffe
8,425,323 B2 4/2013 Fiden et al.
8,523,665 B2 9/2013 Baerlocher
8,585,494 B2 11/2013 Parrinello et al.
8,602,879 B2 12/2013 Paulsen
10,325,450 B2 6/2019 Hallerbach et al.
11,645,889 B2 5/2023 Marantelli
2003/0018564 A1 1/2003 Bonnier et al.
2004/0192437 A1 * 9/2004 Amaitis .............. G07F 17/3288 463/26
2006/0030403 A1 2/2006 Lafky et al.
2010/0120525 A1 * 5/2010 Baerlocher ............. G07F 17/32 463/29
2011/0081962 A1 * 4/2011 Kroon ................. G07F 17/3276 463/26
2011/0111844 A1 5/2011 Anderson et al.
2011/0263320 A1 * 10/2011 Tara .................... G07F 17/3258 463/27
2011/0269548 A1 * 11/2011 Barclay ............... G07F 17/3274 463/43
2011/0270701 A1 11/2011 Black et al.
2012/0015711 A1 1/2012 Belisle
2012/0259764 A1 10/2012 Staib et al.
2014/0162752 A1 * 6/2014 Feldman ................ G06Q 20/06 463/20
2015/0032520 A1 1/2015 Randel
2015/0100447 A1 4/2015 Bohbot (Continued)

*Primary Examiner* — Tramar Harper
(74) *Attorney, Agent, or Firm* — Neal, Gerber & Eisenberg LLP

(57) ABSTRACT

Systems and methods that enable one or more bids placed in association with one award, such as a first progressive award, in an auction bidding sequence, to fund another award, such as a second progressive award.

21 Claims, 12 Drawing Sheets

(56) References Cited

U.S. PATENT DOCUMENTS

| | | | |
|---|---|---|---|
| 2020/0302515 | A1 | 9/2020 | Chandler et al. |
| 2021/0104125 | A1 | 4/2021 | You et al. |
| 2021/0319666 | A1 | 10/2021 | Salivar et al. |
| 2023/0044780 | A1 | 2/2023 | Inamdar |
| 2023/0222616 | A1 | 7/2023 | Flaherty |
| 2023/0222872 | A1 | 7/2023 | Alderucci et al. |

* cited by examiner

FUNDING PROGRESSIVE AWARDS USING AUCTION BIDDING SEQUENCES

CROSS-REFERENCE TO RELATED APPLICATIONS

This application is related to the following commonly owned co-pending patent applications: U.S. application Ser. No. 18/222,750, entitled "AUCTION BIDDING SEQUENCES FOR PROGRESSIVE AWARDS," and U.S. application Ser. No. 18/222,783, entitled "RETIRING PROGRESSIVE AWARDS USING AUCTION BIDDING SEQUENCES".

BACKGROUND

In various embodiments, the gaming systems and methods of the present disclosure enable one or more bids placed in association with one award, such as a first progressive award, in an auction bidding sequence, to fund another award, such as a second progressive award.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In certain embodiments, the present disclosure relates to a system including a processor, and a memory device that stores a plurality of instructions. When executed by the processor, the instructions cause the processor to cause a display, by a display device, of a first progressive award. In these embodiments, when executed by the processor responsive to an occurrence of an award auction triggering event, the instructions cause the processor to enable a plurality of bids to be placed on the first progressive award during an auction bidding sequence, wherein a portion of at least one of the plurality of bids funds a second progressive award. When executed by the processor responsive to one of the plurality of bids determined to be a winning bid, the instructions cause the processor to cause the first progressive award to be provided to a player associated with the winning bid.

In certain embodiments, the present disclosure relates to a system including a processor, and a memory device that stores a plurality of instructions. When executed by the processor, the instructions cause the processor to cause a display, by a display device, of a first progressive award. When executed by the processor responsive to an occurrence of an award auction triggering event, the instructions cause the processor to enable a plurality of bids to be placed on the first progressive award during an auction bidding sequence. When executed by the processor responsive to one of the plurality of bids determined to be a winning bid, the instructions of these embodiments cause the processor to cause the first progressive award to be provided to a player associated with the winning bid, and cause a first portion of at least a first bid of the plurality of bids not determined to be the winning bid to fund a second progressive award. When executed by the processor responsive to none of the plurality of bids determined to be the winning bid, the instructions cause the processor to cause a second portion of at least the first bid to fund the second progressive award.

In certain embodiments, the present disclosure relates to a system including a processor, and a memory device that stores a plurality of instructions. When executed by the processor, the instructions cause the processor to cause a display, by a display device, of a progressive award. When executed by the processor responsive to a first occurrence of a progressive award triggering event prior to an occurrence of an award auction triggering event, the instructions cause the processor to cause the first progressive award to be provided to a player associated with the first occurrence of the progressive award triggering event. When executed by the processor responsive to an occurrence of the award auction triggering event prior to any occurrence of the progressive award triggering event and one of a plurality of bids placed on the first progressive award during an auction bidding sequence determined to be a winning bid, the instructions cause the processor to cause the first progressive award to be provided to a player associated with the winning bid, wherein during the auction bidding sequence, no progressive award triggering event can occur in association with the first progressive award, allocate a first portion of at least one of the plurality of bids to a second progressive award, and responsive to a second occurrence of the progressive award triggering event, cause the second progressive award to be provided to a player associated with the second occurrence of the progressive award triggering event.

Additional features are described herein, and will be apparent from the following Detailed Description and the figures.

DETAILED DESCRIPTION

Figure 1:
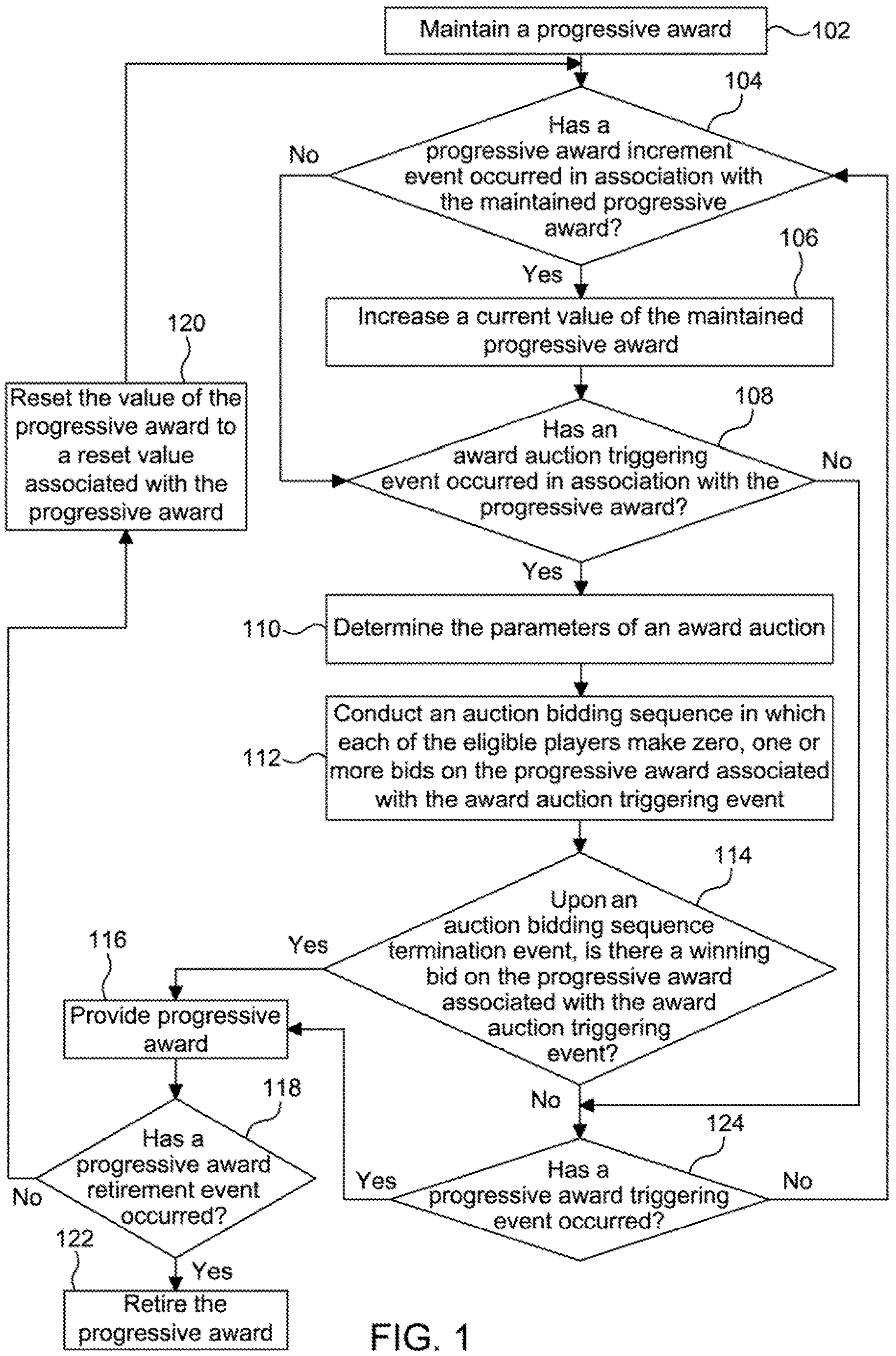
FIG. 1 is a flow chart an example process for operating a gaming system that enables a progressive award to be obtained via an auction.

In various embodiments, the systems and methods of the present disclosure enable one or more bids placed in association with one award, such as a first progressive award, in an auction bidding sequence, to fund another award, such as a second progressive award.

In certain embodiments, the gaming system maintains one or more awards. In these embodiments, upon an award increment event associated with a maintained award, the gaming system increases the value of that award. For example, the gaming system maintains one or more progressive awards and upon a progressive award increment event associated with one of the progressive awards, the gaming system increases the value of that progressive award.

In addition to possibly increasing the value of zero, one or more maintained awards, upon an occurrence of an award auction triggering event associated with a maintained award, the gaming system triggers an auction bidding sequence. In certain embodiments, the award auction triggering event occurs based on a value of the maintained award relative to a threshold value. In these embodiments, in view of how certain awards valued above a threshold value are processed by gaming establishment operators differently from how certain award valued below the threshold value are processed, the gaming system monitors the value of an award relative to a threshold value and initiates an auction bidding sequence for that award (i.e., causes an award auction triggering event to occur) based on the value of the award relative to the threshold value. In certain embodiments, the award auction triggering event occurs in association with a progressive award designated for retirement. In these embodiments, rather than waiting for a progressive award triggering event to occur to potentially retire such a progressive award, the gaming system expedites the opportunity to retire that progressive award by initiating an auction bidding sequence for that progressive award. Such a configuration offers an operational improvement to the gaming system by enabling a progressive award to be taken offline while staying within the various regulatory requirements associated with progressive awards and when they can be taken offline or otherwise retired.

In certain embodiments, a triggered auction bidding sequence includes zero, one or more qualifying players submitting zero, one or more bids to potentially win the triggered auction bidding sequence and be provided the award being auctioned off. In certain embodiments, the gaming system associates a reserve or minimum bid amount for the award in which if no player submits a bid of at least the minimum bid amount, no player wins the triggered auction bidding sequence and the award is not auctioned offer. For example, if a progressive award that grew in value from $100 to $154 is being auctioned off because the gaming establishments wants to retire the progressive award but does not want to wait for the progressive award to be won by a player, the gaming system sets a minimum bid amount of $54 in association with that progressive award.

In certain embodiments, the triggered auction bidding sequence utilizes a bidding fee configuration in which the gaming system retains part or all of the bids each player submits. For example, if the gaming system randomly determined to auction off an award valued at $100 and Player A bids $25, then Player B bids $26, then Player C bids $27 and finally Player D bids $28 and wins the auction as the highest bidder when the triggered auction bidding sequence concludes, the gaming system awards Player D the award valued at $100, but the gaming system has collected $106 (i.e., $25+$26+$27+$28=$106) by retaining the different bids placed. In these embodiments, while the winning bid may ultimately be a lower amount than the current value of the award, by retaining part or all of each of the submitted bids (including the losing bids), the gaming system collects an amount in retained fees that at least equals the current value of the award being auctioned. In certain embodiments, the retained fees fund the award being auctioned and/or one or more subsequent awards maintained by the system. Such a configuration introduces an element of strategy or skill in how players interact with the gaming system insofar that certain players may avoid placing bids of the lowest amount possible knowing that such bids are unlikely to be winning bids and only cost the player unnecessary expenses.

In certain embodiments, upon a conclusion of the triggered auction bidding sequence, such as after an amount of time and/or after a threshold quantity of qualifying players have submitted a threshold quantity of bids, the gaming system determines if any players qualify as a winning player of the triggered auction bidding sequence. In these embodiments, if the gaming system identifies a winning player of the triggered auction bidding sequence, the gaming system provides the winning player the auctioned off award, such as by crediting the amount of the auctioned off award to a balance of a credit meter of an electronic gaming machine being played by that player or by increasing the amount of a gaming establishment account maintained for the winning player by the auctioned off award. If the gaming system does not identify any winning player of the triggered auction bidding sequence, such as because the reserve or minimum bid amount for the award was not reached, the gaming system continues to maintain the award until that award is again placed up for auction or otherwise won via an award triggering event.

Accordingly, unlike prior gaming systems that operated in a static mode of operation in which an award, such as a progressive award, is only available responsive to an award triggering event, the gaming system of the present disclosure employs various modes of operation by offering a plurality of avenues to obtain an award including obtaining an award via an award auction bidding sequence independent of any award triggering event. Such a configuration introduces an operational improvement by enabling multiple ways to provide the same award and thus multiple ways to operate the gaming system to dynamically maintain the availability of that award.

While certain embodiments described below are directed to an award auction that occurs in association with an electronic gaming machine ("EGM") such as a slot machine, a video poker machine, a video lottery terminal, a terminal associated with an electronic table game, a terminal associated with a live table game, a video keno machine, a video bingo machine and/or a sports betting terminal that offers sports betting opportunities, it should be appreciated that such embodiments may additionally or alternatively be employed in association with an award auction that occurs in association with a personal gaming device, such as desktop computers, laptop computers, tablet computers or computing devices, personal digital assistants, mobile phones, and other mobile computing devices that offer plays of wagering games (and in certain instances, sports betting opportunities). Furthermore, while the player's credit balance, the player's wager, the player's bid and any awards are displayed as an amount of monetary credits or currency, in certain of the embodiments described below, one or more of such player's credit balance, such player's wager, and any awards provided to such a player may be for non-monetary credits, promotional credits, and/or player tracking points or credits.

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, the gaming system maintains a progressive award as indicated in block 102. In certain embodiments, the award is a stand-alone progressive award associated with a single EGM. In certain embodiments, the award is part of a plurality of progressive awards maintained in a multi-level progressive award configuration ("MLP") associated with a single EGM. In certain embodiments, the award is a stand-alone progressive award associated with a plurality of EGMs. In certain embodiments, the award is part of a plurality of progressive awards maintained in an MLP associated with a plurality of EGMs. In different embodiments wherein the award is associated with a plurality of EGMs, the EGMs may be in (or otherwise associated with) a single gaming establishment (such that the progressive award may be considered a local area progressive ("LAP")) or the EGMs may be in (or otherwise associated with) two or more different gaming establishments (such that the progressive award may be considered a wide area progressive ("WAP")).

In certain embodiments, the maintained progressive award is associated with a reset value utilized following a progressive award triggering event. In certain embodiments wherein the gaming system maintains a plurality of progressive awards, each of the progressive awards maintained by the gaming system have the same progressive award reset value. In certain embodiments wherein the gaming system maintains a plurality of progressive awards, two or more of the progressive awards maintained by the gaming system have different progressive award reset values.

In certain embodiments, the maintained progressive award is also associated with a progressive award contribution rate that represents, in certain instances, the portion of each wager placed (or the portion of each designated wager, such as a maximum wager, placed) that is allocated to the progressive award. In certain embodiments wherein the gaming system maintains a plurality of progressive awards, each of the progressive awards maintained by the gaming system have the same progressive award contribution rate. In certain embodiments wherein the gaming system maintains a plurality of progressive awards, two or more of the progressive awards maintained by the gaming system have different progressive award contribution rates.

In certain embodiments, the maintained progressive award is associated with a range of values, wherein the low end of the range of values represents the reset value of the progressive award and the high end of the range of values represents the maximum amount which the progressive award may reach. In these embodiments, the amount which the progressive award may be incremented to is capped or limited by the highest value in the value range associated with such progressive award. In these embodiments, the gaming system determines a progressive award hit value from the value range associated with the progressive award and displays the current value of the progressive award and/or the maximum amount which the progressive award may reach. In other embodiments, the progressive award is not associated with any range of values. In this embodiment, the progressive award continues to be incremented until a progressive award triggering event occurs.

In certain embodiments, the maintained progressive award is associated with a minimum bid value utilized as part of an award auction bidding sequence. In these embodiments, the minimum bid value represents the lowest bid that may be submitted during the award auction bidding sequence (i.e., any bids below the minimum bid value are dismissed by the gaming system as being outside the parameters of the award auction bidding sequence). In certain embodiments wherein the gaming system maintains a plurality of progressive awards, each of the progressive awards maintained by the gaming system have the same minimum bid value. In certain embodiments wherein the gaming system maintains a plurality of progressive awards, two or more of the progressive awards maintained by the gaming system have different minimum bid values.

In addition to maintaining the progressive award, the gaming system determines if a progressive award increment event has occurred in association with the maintained progressive award as indicated in diamond 104. In one such embodiment, the progressive award increment event occurs based on (or as a result of) a wager being placed on a play of a game at an EGM associated with that award. In another such embodiment, the progressive award increment event additionally or alternatively occurs based on (or as a result of) a side wager being placed at an EGM associated with that award. In another such embodiment, the progressive award increment event additionally or alternatively occurs based on (or as a result of) one or more displayed events occurring in association with one or more plays of one or more games. For example, the display of one or more symbols during a play of a game results in an occurrence of a progressive award increment event. In another such embodiment, the progressive award increment event occurs independent of any displayed events associated with any plays of any games. For example, a gaming establishment may periodically cause an occurrence of a progressive award increment event with funds drawn from the gaming establishment marketing department.

If the gaming system determines that a progressive award increment event occurred, the gaming system increases a current value of the maintained progressive award as indicated in block 106. In certain embodiments wherein the progressive award increment event occurs based on a placed wager, the increase of the maintained award is funded by a portion of the wager placed (e.g., a progressive award contribution rate of 1% of the amount of the wager placed is allocated to growing the progressive award). In certain other embodiments wherein the progressive award increment event occurs based on a placed side wager, the increase of the maintained award is funded by part or all of the side wager placed (e.g., a progressive award contribution rate of 50% of the amount of the side wager placed is allocated to growing the progressive award). In certain other embodiments, the gaming system utilizes an amount provided by one or more marketing and/or advertising departments, such as a gaming establishment marketing department, to fund part or all of the increase of the maintained award upon an occurrence of a progressive award increment event.

In addition to increasing the progressive award (if the progressive award increment event occurs) or maintaining the progressive award (if no progressive award increment event occurs), the gaming system determines if an award auction triggering event occurred in association with the progressive award as indicated in diamond 108 of FIG. 1. In these embodiments, in addition to enabling a progressive award to be won in association with a progressive award triggering event, the gaming system enables a progressive award to potentially be won via a player winning an auction for that progressive award.

In certain embodiments, an award auction triggering event occurs based on one or more displayed events occurring in association with one or more plays of one or more games. In certain embodiments, an award auction triggering event occurs based on a player achieving a certain outcome, such as obtaining one of more outcomes associated with a specific win category (e.g., winning a royal flush). In certain other embodiments, an award auction triggering event occurs based on a player (or a group of players) winning a certain amount from a play of a single game or winning a certain amount over a period of time. In certain other embodiments, an award auction triggering event occurs based on a player (or a group of players) maintaining an active gaming session for a certain amount of time and/or over a certain quantity of games played.

In certain embodiments, an award auction triggering event occurs independent of any displayed events associated with any plays of any games. In one embodiment, an award auction triggering event randomly occurs. In another embodiment, an award auction triggering event occurs at a randomly selected time.

In certain embodiments, one or more actions (or inactions) undertaken by a player at least partially determines whether an award auction triggering event occurs. In one such embodiment, an award auction triggering event occurs based on a player making one or more inputs requesting an occurrence of an award auction bidding sequence. For example, if a player at an EGM that maintains a progressive award with a reset value of $500 and a current value of $515 does not want to potentially play for hours to win the recently reset progressive award, the gaming system enables the player to request an award auction of the progressive award. In this example, upon receiving the request, the gaming system determines whether to accept the request (and cause an award auction triggering event to occur in association with the progressive award) or reject the request (and maintain the progressive award without any occurrence of an award auction triggering event).

In certain embodiments, the gaming system enables any player to request an occurrence of an award auction triggering event. In one such embodiment, following a player requesting an award auction triggering event in association with a progressive award, the gaming system asks all of the players playing for the progressive award if they would like to also participate in an auction for the progressive award. If at least a threshold minimum quantity of players indicate they want to participate, the gaming system causes the award auction triggering event to occur. On the other hand, if less than the threshold minimum quantity of players indicate they want to participate, no award auction triggering event occurs in association with the progressive award. It should be appreciated that different progressive awards may have different threshold minimum quantities (e.g., based on the amount of the progressive award) and the same progressive award may have different threshold minimum quantities (e.g., based on the time or day).

In another embodiment, an award auction triggering event occurs based on a player purchasing an occurrence of the event using one or more of an amount of funds, an amount of virtual currency and/or an amount of player tracking points. In one such embodiment, an award auction triggering event occurs based on a player purchasing such an event for a static fee (in the form of an amount of funds, an amount of virtual currency and/or an amount of player tracking points). In another such embodiment, an award auction triggering event occurs based on a player purchasing such an event for a dynamic fee (in the form of an amount of funds, an amount of virtual currency and/or an amount of player tracking points).

In certain embodiments in which the system maintains a plurality of awards, different maintained awards have different purchase prices of an award auction triggering event occurring in association with that award. In certain embodiments in which the system maintains a plurality of awards, each award has the same purchase price of an award auction triggering event occurring in association with that award. In certain embodiments, a probability of winning an award at least partially determines a purchase price of an award auction triggering event occurring in association with that award. In certain embodiments, a current value (and/or a reset value) of a progressive award at least partially determines a purchase price of an award auction triggering event occurring in association with that progressive award.

In certain embodiments, different players have different requirements to cause an award auction triggering event to occur. In certain such embodiments, a player's wagering history at least partially determines whether or not that player is eligible to cause an award auction triggering event to occur. In certain embodiments, which EGM the player is currently conducting a gaming session at at least partially determines whether or not that player is eligible to cause an award auction triggering event to occur. In these embodiments, a player can initiate an auction in association with a certain EGM operating in a certain configuration, such as a player can initiate an auction for a certain themed EGM of a certain denomination and the player cannot initiate any auctions at other themed EGMs or other denominations of that themed EGM. In certain other embodiments, a player's non-wagering history, such as a player's historical non-wagering purchases and/or a player's historical location data (as determined via a mobile device of the player and/or a gaming establishment patron management system, such as a player tracking system) at least partially determines whether or not that player is eligible to cause an award auction triggering event to occur.

In certain embodiments, a player's status (as determined by a gaming establishment patron management system, such as a player tracking system) at least partially determines one or more requirements to cause an award auction triggering event to occur. In these embodiments, different players of different statuses are associated with different requirements to cause an award auction triggering event to occur. For example, all players associated with a player tracking status (or alternatively all players regardless of being assigned a player tracking status) are eligible to request an occurrence of an award auction triggering event, but the respective costs to such players to cause the award auction triggering event to occur differs based on each player's respective player tracking status. In another example, certain players of certain player tracking statuses are eligible to request an occurrence of an award auction triggering event while certain other players of certain other player tracking statuses (or not player tracking status) are ineligible to request an occurrence of an award auction triggering event.

In certain embodiments, the gaming system enables qualifying players to request an occurrence of an award auction triggering event and prevents non-qualifying players from making such requestions. In certain such embodiments, the gaming system enables players at EGMs associated with a progressive award to request an occurrence of an award auction triggering event for that progressive award. In certain such embodiments, the gaming system enables players of a certain status to request an occurrence of an award auction triggering event (e.g., a player must be a member of a gaming establishment loyalty program to make a request or a player must be of at least a certain status of a gaming establishment loyalty program to make a request). In certain embodiments, the gaming system enables players whom have maintained an active gaming session for a certain amount of time and/or over a certain quantity of games played to make a request for an award auction triggering event. In certain embodiments, the gaming system enables players whom have wagered a certain amount over a period of time to make the request for an award auction triggering event. In certain embodiments, an award auction triggering event occurs based on a player (or group of players) wagering a certain amount over a period of time. In other embodiments, an award auction triggering event occurs based on a player (or group of players) participating in one or more offerings available to the player. Such different embodiments that require gaming activity to request an occurrence of an award auction triggering event prevent players from just walking up to an EGM, bidding on an award and leaving without playing at least a minimum quantity of games.

In another embodiment, an award auction triggering event occurs or is otherwise enabled based on a current state of a gaming establishment. For example, upon the gaming system determining that gaming activity at a gaming establishment is currently lower than expected, the gaming system enables the occurrence of one or more award auction triggering events for a set amount of time or until the gaming system determines that the level of gaming activity at the gaming establishment is more in line with expectations. In another embodiment, an award auction triggering event occurs or is otherwise enabled based on a current state of the progressive award. For example, upon the gaming system determining that the current value of a progressive award is within a designated range of a threshold value, the gaming system causes the award auction triggering event to occur for that progressive award (thereby ensuring that the progressive award does not reach the threshold value).

In another embodiment, an award auction triggering event occurs as part of a gaming establishment promotion. In certain such embodiments, one or more actions (or inactions) undertaken by the gaming system (or an operator of the gaming system) determines whether an award auction triggering event occurs. In one such embodiment, an award auction triggering event occurs based on an operator of the gaming system making one or more inputs requesting an occurrence of an award auction bidding sequence. For example, if an operator wants to retire a progressive award from being associated with one or more EGMs, rather than having to wait until the progressive award is otherwise provided (per certain regulations), the operator requests an award auction triggering event to occur (which results in the progressive award being provided and then available to be retired). In this example, since certain regulations require that funds contributed to a progressive award by players must be provided to one or more players (which prevents a gaming establishment from taking a progressive award offline while any amount of player provided funds have been contributed to the progressive award), the gaming system employs an award auction bidding sequence to expedite the providing of the progressive award and the ability of the gaming establishment to then take the progressive award offline. In other words, by using an award auction bidding sequence to provide a progressive award to a player, the gaming system of the present disclosure offers an accelerated avenue to retire a progressive award and effectively eliminate any fund liability to manage. As such, the selective employment of an auction bidding sequence represents an improved gaming establishment floor management tool that saves gaming establishment operators time and increases efficiencies in the retirement of progressive awards.

In certain embodiments, the gaming system enables an award auction triggering event to occur in association with each of the maintained awards. In certain embodiments, the gaming system enables an award auction triggering event to occur in association with certain of, but not each of, the maintained awards. In certain embodiments, the gaming system requires an award auction enablement event to occur in association with a maintained award for that award to potentially be auctioned off. In one such embodiment, the gaming system enables players currently playing for an award to vote to enable that award to be part of an award auction bidding sequence. In this embodiment, if all (or at least a threshold percentage) of the players decide to enable the award auction, the gaming system makes such a feature available. In another such embodiment, the gaming system enables players currently playing for an award to vote to disable that award from being auctioned off. In this embodiment, if all (or at least a threshold percentage) of the players decide to disable the feature, the gaming system makes such a feature unavailable.

If the gaming system determines an award auction triggering event occurs, the gaming system determines the parameters of an award auction as indicated in block 110 of FIG. 1. In these embodiments, upon a determination that an auction bidding sequence will take place for a player to potentially win an award independent of any award triggering event, the gaming system determines one or more characteristics of that auction bidding sequence.

In certain embodiments, a parameter of an award auction includes which award to be auctioned off. In certain embodiments, any award is eligible to be auctioned off. For example, any progressive award that is known or unknown to players may be auctioned off as part of an award auction. In certain other embodiments, certain awards are eligible to be auctioned off and certain other awards are ineligible to be auctioned off. For example, awards over a threshold amount are ineligible to be auctioned off while awards below the threshold level may be auctioned off. In another example, displayed progressive awards may be auctioned off while hidden progressive awards (i.e., a non-displayed pool that grows in value) may not be auctioned off. In certain embodiments, one or more factors associated with an award, such as a current value of that award, an amount that award has grown in value, a probability of that award being provided independent of any award auction and/or how long since that award was last provided, determine whether or not an award is eligible to be auctioned off.

In certain embodiments in which the parameter of the award auction includes which award is to be auctioned off, the gaming system enables a player to auction off a personal progressive award maintained for that individual player. In these embodiments, the gaming system maintains one or more personal progressive awards (i.e., a progressive award maintained for an individual player that is funded at least partially by that individual player and available to be won only by that individual player) and enables that player to auction off their personal progressive award (for part, all or none of the proceeds from the auction). For example, if a player who contributed to a personal progressive award for a number of days while visiting a gaming establishment is leaving the gaming establishment without winning the personal progressive award, the gaming system enables that player auction off their personal progressive award before leaving to guarantee the player receives some (or all) of the winning bids for their personal progressive award.

In certain embodiments, a parameter of an award auction includes a minimum bid amount for the award auction. In certain embodiments, a parameter of an award auction includes a minimum bid increment for the award auction. In certain embodiments, a parameter of an award auction includes a minimum quantity of bids that must be placed in the award auction for the award to be provided to the winning bid. In certain embodiments, different players of different statuses and/or different wagering histories are associated with one or more of different (or the same) minimum bid amounts, and/or different (or the same) minimum bid increments.

In certain embodiments, a parameter of an award auction includes a composition of one or more bids that may be placed and/or one or more fees required to place such bids. In one such embodiments, one or more bids and/or one or more fees take the form of monetary amounts. In another such embodiment, one or more bids and/or one or more fees take the form of non-monetary amounts, such as in promotional credit and/or player tracking points. For example, a player bids 10,000 player tracking points for a progressive prize of $500. In another such embodiment, one or more bids and/or one or more fees take the form of a combination of monetary amounts and non-monetary amounts. For example, a player bids 5,000 player tracking points plus $100 for the progressive prize of $500. In another example, a player pays 500 player tracking points as a bidding fee and bids $475 for the progressive prize of $500. It should be appreciated that utilizing player tracking points as part of an auction provides an additional avenue for gaming establishments to encourage use of their player tracking points (with the additional benefit of removing the liability that player tracking points represents from the gaming establishment).

In certain embodiments, a parameter of an award auction includes a maximum quantity of bids one or more players may make in the award auction. In certain embodiments, a parameter of an award auction includes a maximum total quantity of bids that may be made by all players in the award auction. In certain embodiments, different players of different statuses and/or different wagering histories are associated with one or more of different (or the same) maximum quantities of bids placed.

In certain embodiments, a parameter of an award auction includes a minimum quantity of players that must place a bid in the award auction for the award to be provided to the winning bid. In certain embodiments, a parameter of an award auction includes a maximum quantity of players that may place a bid in the award auction.

In certain embodiments, a parameter of an award auction includes an amount that is auctioned off. In one such embodiment, the gaming system auctions off the progressive award at its current amount. In another such embodiment, the gaming system auctions off the progressive award at a different amount, such as a larger amount. In this embodiment, in view of the paperwork required if the value of an award provided to a player is greater than a threshold value, the gaming system auctions off a progressive award for an increased value (relative to the current value of the progressive award) that is lower than the threshold value.

In certain embodiments, a parameter of an award auction include a determination of which players are eligible (or conversely ineligible) to place bids in the award auction and/or a quantity of bids such players may place. In certain embodiments, the gaming system determines if an individual player is eligible to participate in the award auction and/or a quantity of bids that player may place based on one or more displayed events associated with one or more plays of one or more games. In these embodiments, the ability to place a bid in an award auction is won based on one or more outcomes of one or more games played.

In certain embodiments, the gaming system determines if an individual player is eligible to participate in the award auction and/or a quantity of bids that player may place independent of any displayed events associated with any plays of any games. In certain embodiments, one or more actions (or inactions) undertaken by a player at least partially determines whether that player is eligible to place one or more bids in the award auction and/or a quantity of bids that player may place. In another embodiment, the gaming system determines if a player is eligible to participate in the award auction and/or a quantity of bids that player may place based on a player purchasing eligibility using one or more of an amount of funds, an amount of virtual currency and/or an amount of player tracking points. In one such embodiment, the gaming system determines if a player is eligible to participate in the award auction and/or a quantity of bids that player may place based on a player purchasing such eligibility for a static fee (in the form of an amount of funds, an amount of virtual currency and/or an amount of player tracking points). In another such embodiment, the gaming system determines if a player is eligible to participate in the award auction and/or a quantity of bids that player may place based on a player purchasing such eligibility for a dynamic fee (in the form of an amount of funds, an amount of virtual currency and/or an amount of player tracking points). In certain embodiments in which the system maintains a plurality of awards, different maintained awards have different eligibility purchase prices. In certain embodiments in which the system maintains a plurality of awards, each award has the same eligibility purchase price. In certain embodiments, a probability of winning an award at least partially determines an eligibility purchase price. In certain embodiments, a current value (and/or a reset value) of a progressive award at least partially determines an eligibility purchase price.

In certain embodiments, different players have different requirements to participate in an award auction and/or different quantities of bids such players may place. In certain such embodiments, a player's wagering history at least partially determines whether or not that player is eligible to participate in an award auction and/or a quantity of bids that player may place. In certain embodiments, which EGM the player is currently conducting a gaming session at (and/or the configuration of the EGM, such as the game theme and/or denomination) at least partially determines whether or not that player is eligible to participate in an award auction and/or a quantity of bids that player may place. In certain other embodiments, a player's non-wagering history, such as a player's historical non-wagering purchases and/or a player's historical location data (as determined via a mobile device of the player and/or a gaming establishment patron management system, such as a player tracking system) at least partially determines whether or not that player is eligible to participate in an award auction and/or a quantity of bids that player may place.

In certain embodiments, a player's status (as determined by a gaming establishment patron management system, such as a player tracking system) at least partially determines whether or not that player is eligible to participate in an award auction and/or a quantity of bids that player may place. In these embodiments, different players of different statuses are associated with different requirements to participate in an award auction and/or different quantities of bids available to place. For example, all players associated with a player tracking status (or alternatively all players regardless of being assigned a player tracking status) are eligible to participate in an award auction, but the respective costs to such players is based on each player's respective player tracking status. In another example, certain players of certain player tracking statuses are eligible to participate in an award auction while certain other players of certain other player tracking statuses (or not player tracking status) are not eligible to participate in an award auction.

Figure 2:
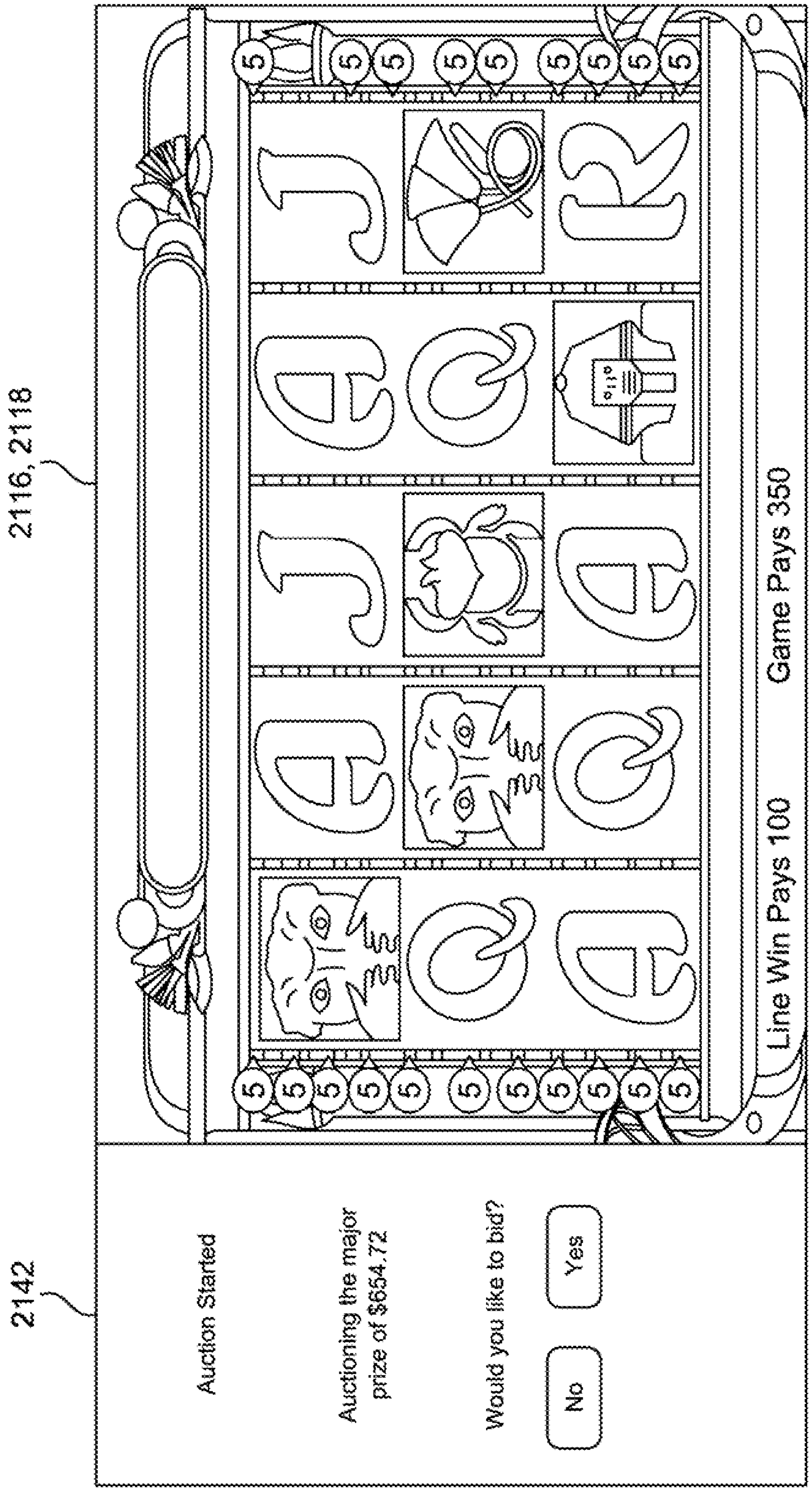
FIG. 2 is a front view of one embodiment of the gaming system of the present disclosure illustrating a player at an electronic gaming machine having the opportunity to place a bid to potentially obtain a progressive award via an auction.

In certain embodiments, the gaming system enables qualifying players to participate in an award auction and prevents non-qualifying players from participating in an award auction. In certain such embodiments, the gaming system enables players at EGMs associated with a progressive award to participate in an award auction. For example, as seen in FIG. 2, if a player is playing an EGM that is associated with a progressive award and an award auction has commenced in association with that progressive award, the gaming system enables that player to interact with a service window 2142 to place a bid to potentially win that progressive award. In certain embodiments, the gaming system enables players whom have maintained an active gaming session for a certain amount of time and/or over a certain quantity of games played to participate in an award auction. In certain embodiments, the gaming system enables players whom have wagered a certain amount over a period of time to participate in an award auction. Such embodiments that require gaming activity to participate in an award auction prevent players from just walking up to an EGM, bidding on an award and leaving without playing at least a minimum quantity of games. In certain embodiments, the gaming system enables any players to participate in any award auction for any available award.

In certain embodiments, a parameter of an award auction includes a type of auction to run. In one such embodiment, the type of auction to run includes a bidding fee auction in which the player placing the bid pays a fees to place the bid. In another such embodiment, the type of auction to run includes an increasing-price auction (e.g., an English auction) in which the award to be auctioned off is offered at increasing prices. In another such embodiment, the type of auction to run includes a sealed-bid auction in which each bidding player submits a sealed bid and the gaming system selects the bidder with the highest bidding price. In another such embodiment, the type of auction to run includes a Popcorn auction wherein the last bid extends the time allocated to the auction and the auction ends when a timer runs out. In another such embodiment, the type of auction to run includes an decreasing-price auction (e.g., a Dutch auction). In another such embodiment, the type of auction to run includes a second-price auction (e.g., a Vickrey auction) in which each bidding player submits a sealed bid and the gaming system selects the bidder with the highest bidding price but requires that bidder to pay the price that the second highest bidder has bid. In another such embodiment, the type of auction to run includes a double auction.

In certain embodiments, a parameter of an award auction includes a duration of the auction. In certain embodiments, the duration of the auction is based on time. In certain such embodiments, the gaming system determines that an auction will continue until a period of time expires (e.g., for the next fifteen minutes, a specific level of an MLP configuration will be part of an auction). In certain other embodiments, the gaming system determines that an auction will continue until a certain time of day (e.g., until 3:00 PM, a progressive award is available to be obtained via auction).

In certain embodiments, the duration of the auction is based on an interval measured by a quantity of events occurring. In certain such embodiments, the quantity of events include a number of games played (e.g., an auction will continue until five-hundred games are played). In certain embodiments, the duration of the auction is based on an interval measured by an accumulation. In certain such embodiments, the accumulation includes an amount of wagers placed and/or an amount of money won (e.g., until $1000 of wagers are placed, a specific level of an MLP configuration will be available to be obtained via auction). In certain embodiments, the duration of the auction is based on two or more of an amount of time, a quantity of events occurring and/or an accumulation, whichever comes first (or last).

In certain embodiments, the duration of the auction is based on an occurrence (or lack thereof) of another event. In certain embodiments, the duration of the auction continues until the duration of the auction lapses. In certain such embodiments, the duration of the auction continues until a request is received to terminate the auction. In certain other embodiments, the duration of the auction continues until the award associated with the award auction triggering event is otherwise provided. In certain other embodiments, the duration of the auction continues beyond the award associated with the award auction triggering event being provided (e.g., the auction continues employing the reset value of a progressive award being auctioned off).

In certain embodiments, the parameter of an award auction pertain to when an auction may begin. In certain such embodiments, to enable a progressive award an opportunity to grow in value, the gaming system utilizes a parameter that an auction cannot start for a certain amount of time after a progressive award is reset. In another embodiment, the gaming system utilizes a parameter that the auction cannot start after the progressive award grows to a certain amount.

Following the determination of the parameters of an award auction, as indicated in block 112 of FIG. 1, the gaming system conducts an auction bidding sequence in which the gaming system enables each of the eligible players to make zero, one or more bids on the progressive award associated with the award auction triggering event.

Figure 3A:
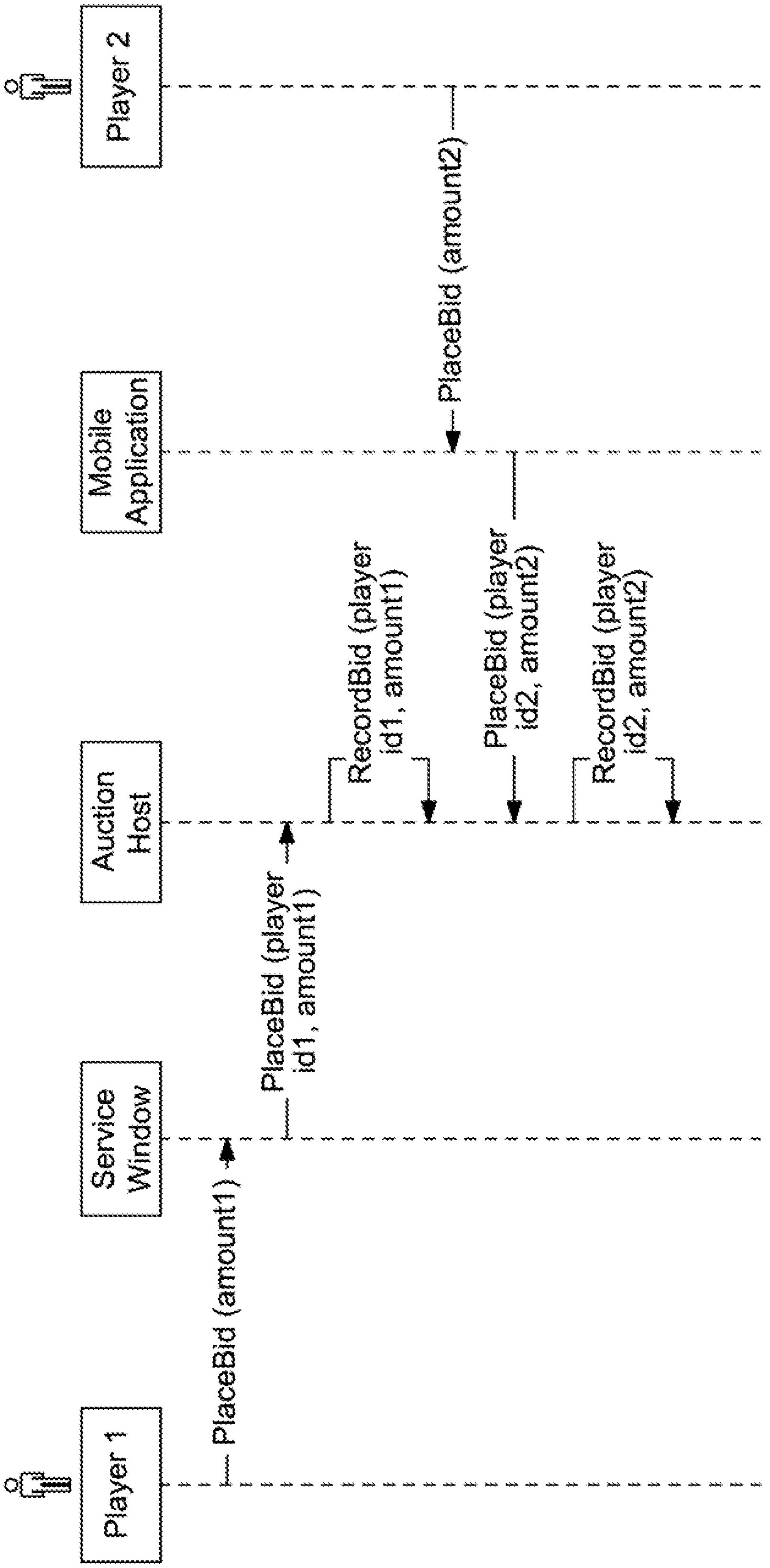
FIGS. 3A, 3B, 3C, 3D, 3E, 3F, and 3G are flow charts of example processes for operating a gaming system that enables a progressive award to be obtained via an auction.

In certain embodiments, the gaming system enables an eligible player to place a bid in the auction bidding sequence using an externally controlled interface (i.e., a service window) displayed by the EGM. For example, as seen in FIG. 3A (which illustrates the described interactions between a first player, the service window and a component facilitating the award auction), certain embodiments of the auction bidding sequence include an identified player (i.e., Player 1) making one or more inputs via a service window displayed by an EGM wherein such inputs are conveyed to the component facilitating the award auction (i.e., the Auction Host) to place a bid associated with the player's identification and the amount of the bid.

In certain embodiments, the gaming system enables an eligible player to place a bid in the auction bidding sequence using a mobile device application being executed by a mobile device. For example, as seen in FIG. 3A (which illustrates the described interactions between a second player, the mobile device application and a component facilitating the award auction), certain embodiments of the auction bidding sequence include an identified player (i.e., Player 2) making one or more inputs via a mobile device application wherein such inputs are conveyed to the component facilitating the award auction (i.e., the Auction Host) to place a bid associated with the player's identification and the amount of the bid.

It should be appreciated that in different embodiments, in addition to or alternatively from utilizing a mobile device running a mobile device application and/or an externally controlled interface, such as an EGM displayed service window to, amongst other actions, place one or more bids on an award being auctioned off in an auction bidding sequence, the system utilizes a kiosk, a gaming establishment device, such as a gaming device (e.g., an interface of an EGM or gaming table component) or a non-gaming device (e.g., a retail point-of-sale terminal), a display device/input device associated with a seat-level gaming table component, a display device/input device associated with a table-level gaming table component, a display device/input device associated with a mobile gaming table component, a component of a gaming establishment patron management system, such as a player tracking unit, and/or a gaming establishment interface, such as a casino desk, to, amongst other actions, place one or more bids on an award being auctioned off in an auction bidding sequence.

Figure 3B:
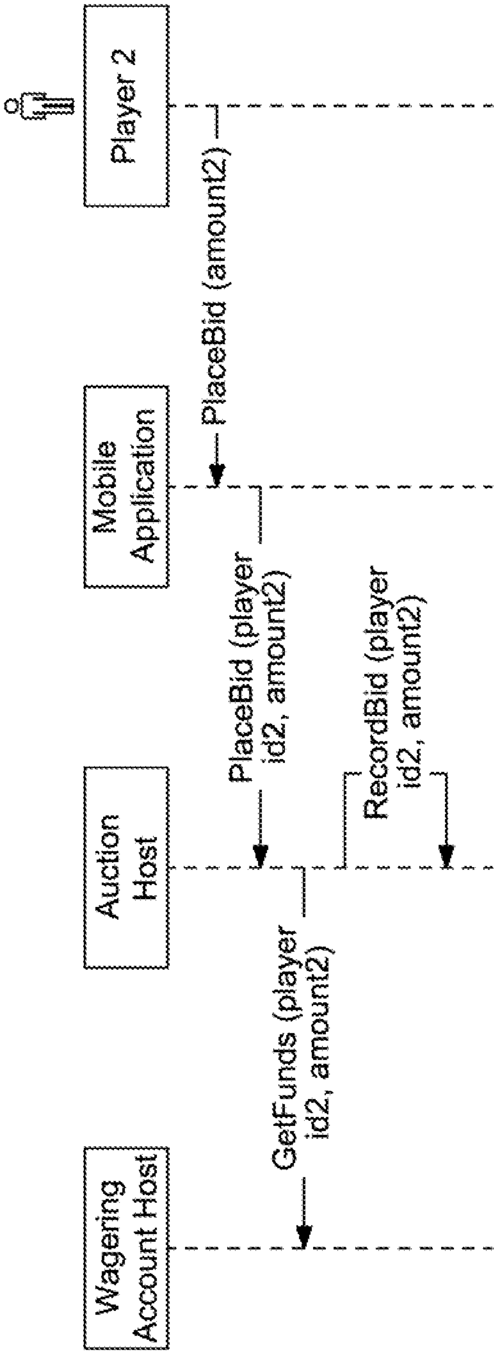

In certain embodiments, in association with the placement of a bid in the auction bidding sequence, the gaming system obtains funds maintained in a gaming establishment account associated with the player. In these embodiments, a gaming establishment fund management system maintains one or more accounts, such as cashless wagering accounts, that the gaming system interfaces with to obtain the funds needed to place one or more bids. For example, as seen in FIG. 3B (which illustrates the described interactions between a second player, the mobile device application, a component facilitating the award auction and a component of a gaming establishment fund management system), certain embodiments of the auction bidding sequence include an identified player (i.e., Player 2) making one or more inputs via a mobile device application wherein such inputs are conveyed to the component facilitating the award auction (i.e., the Auction Host) to place a bid associated with the player's identification and the amount of the bid and the component facilitating the award auction proceeds to interface with the component of the gaming establishment fund management system (i.e., the Wagering Account Host) to retrieve the funds needed for the bid to be placed from an account maintained by the component of the gaming establishment fund management system.

Figure 3C:
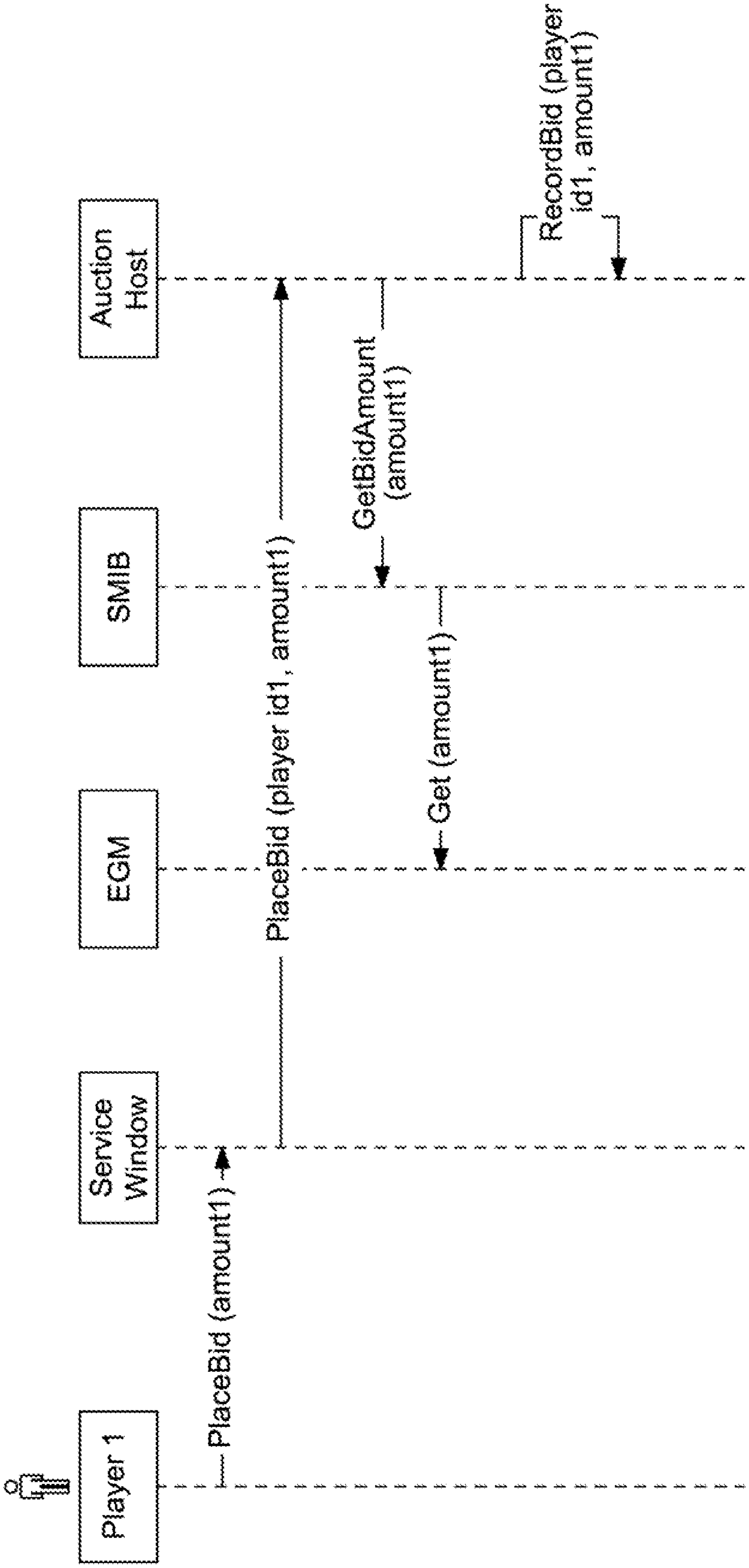

In certain embodiments, in association with the placement of a bid in the auction bidding sequence, the gaming system utilizes funds from a credit balance of an EGM. In these embodiments, following an input by a player at an EGM to place a bid, the EGM (or a component accessible by the EGM) operates with a component running the auction that operates, directly or indirectly with a component of a gaming establishment patron management system, such as a slot machine interface board ("SMIB"), to remove the amount of the bid from a credit meter of the EGM. For example, as seen in FIG. 3C (which illustrates the described interactions between a player, an EGM, an externally controlled interface displayed by the EGM, a component of a gaming establishment patron management system and a component facilitating the award auction), certain embodiments of the auction bidding sequence include an identified player making one or more inputs via a service window displayed by an EGM wherein such inputs are conveyed to the component facilitating the award auction (i.e., the Auction Host). In this example, the component facilitating the award auction operates with the component of the gaming establishment patron management system (i.e., the SMIB) to obtain funds for the placed bid from the credit balance of the EGM using one or more gaming protocols (e.g., SAS and/or G2S protocols). In certain other embodiments in which funds from a credit balance of an EGM are utilized to place a bid, following an input by a player at an EGM to place a bid, the EGM (or a component accessible by the EGM) operates with a component running the auction that operates, directly or indirectly with the EGM, to remove the amount of the bid from a credit meter of the EGM using one or more gaming protocols (e.g., SAS and/or G2S protocols).

In certain embodiments, as part of the auction bidding sequence, the component facilitating the award auction (i.e., the Auction Host) stores data, such as, but not limited to, an auction identifier, an auction start time, the determined parameters associated with the auction including at least the award to potentially be auctioned off, the reserve amount, a maximum number of bids, a duration, a minimum number of bids, a minimum number of players bidding, an identification of zero, one or more players, an identification of zero, one or more account identifiers associated with zero, one or more players and each bid placed (including when the bid was placed, by whom the bid was placed, where the bid was placed and the amount of the placed bid). Such data further includes a state of the auction, such as if the auction is started, in progress, failed (e.g., the auction did not meet certain minimum criteria to proceed), or finished and awarded. In these embodiments, as bids are placed, data associated with the bids is stored in a bids table (or other data storage). Using such a bids table enables the gaming system to determine a winning bidder by, in certain instances, running a query to find the largest bidder.

In certain embodiments, the auction bidding sequence continues with zero, one or more players making zero, one or more bids until the duration of the auction bidding sequence concludes (i.e., an occurrence of an auction bidding sequence termination event). In certain embodiments in which a parameter of the award auction includes a duration of the award auction, the gaming system determines if an auction bidding sequence termination event occurs based on the specified parameter of the award auction, such as an amount of time associated with the auction bidding sequence lapsing, at a certain time of day, when no more bids have been received in a certain amount of time, upon a random event and/or upon an input from an operator.

In certain embodiments, upon an occurrence of an auction bidding sequence termination event, the gaming system determines if there is a winning bid on the progressive award associated with the award auction triggering event as indicated by diamond 114 of FIG. 1. For example, when the auction bidding sequence comes to an end at a designated point in time, the gaming system determines if the highest bid placed is at least equal to a minimum bid associated with the auction bidding sequence such that a winning bid on the progressive award exists.

In certain embodiments, if the gaming system determines if there is a winning bid on the progressive award associated with the award auction triggering event, as indicated in block 116, the gaming system provides the progressive award (associated with the occurrence of the award auction triggering event). In certain such embodiments, the gaming system utilizes one or more EGMs, remote host controlled service windows, components of a gaming establishment patron management system (e.g., player tracking units) and/or mobile devices running mobile device applications to display information associated with the auction bidding sequence, such as displaying to each player that placed a bid if they won or lost the auction and/or whom won the auction and what the winning bid was.

It should be appreciated that rather than having to potentially play one or more games for an extended period of time to potentially win a progressive award (and suffer various degrees of jackpot fatigue in the process), the gaming system enables a player to bypass such an extended period of game play and directly obtain the progressive award based on the decisions the player makes during the auction bidding sequence for that progressive award. In certain of these embodiments, for a limited duration during which a maintained progressive award is available during the auction bidding sequence, the gaming system temporarily modifies the probability of the progressive award being won via the occurrence of a progressive award triggering event to 0% such that the progressive award is temporarily not available outside of the auction bidding sequence.

In certain embodiments, the gaming system determines a single winning bid for a progressive award and causes that progressive award to be provided to the player that placed that single winning bid. In certain embodiments, the gaming system determines a plurality of winning bids and causes one or more progressive awards to each be provided to the players that placed such winning bids. For example, if each of the three levels of an MLP configuration are being auctioned, the gaming system enables players to placed bids on winning all three levels. In this example, the gaming system causes the highest bidder to win the top tier of the MLP configuration, the second highest bidder to win the next tier of the MLP configuration and the third highest bidder to win the third tier of the MLP configuration.

In certain embodiments, after determining a winning bid on the progressive award being auctioned, the gaming system retains the winning bid and returns the non-winning bids to the players that placed such non-winning bids. In certain embodiments, after determining a winning bid on the progressive award being auctioned, the gaming system retains the winning bid and returns a portion, but not all, of the non-winning bids to the players that placed such non-winning bids. In these embodiments, the gaming system retains a percentage of each non-winning bid and/or a set amount from each non-winning bid. In certain embodiments, after determining a winning bid on the progressive award being auctioned, the gaming system retains the winning bid and retains the non-winning bids. Such retention of part or all of the non-winning bids not only provides a framework for progressive awards to be obtained for bid amounts less than the current value of the progressive award but also introduces an element of strategy or skill in how players interact with the gaming system insofar that certain players may avoid placing bids of the lowest amount possible knowing that such bids are unlikely to be winning bids and only cost the player unnecessary expenses.

Figure 3D:
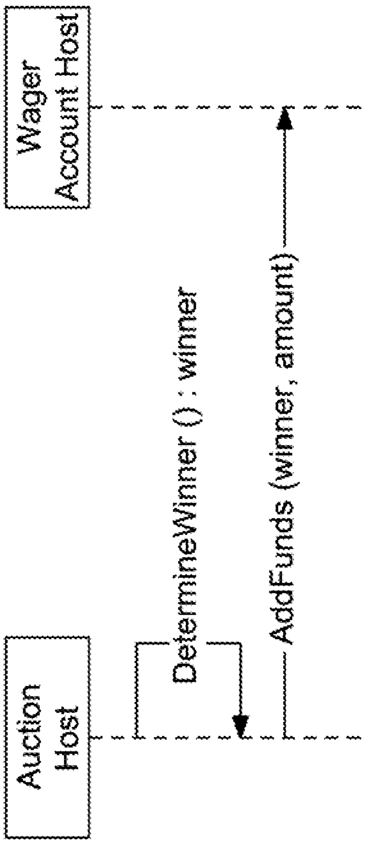

In certain embodiments in which the identity of the winning player is known, the gaming system operates with one or more components of a gaming establishment fund management system to add the amount of the progressive award to an account maintained for that identified player. In these embodiments, even if the player has left the location where that player placed the now winning bid on the progressive award, the gaming system is still able to credit the player's account with the won progressive award. For example, as seen in FIG. 3D (which illustrates the described interactions between a component facilitating the award auction and a component of a gaming establishment fund management system), certain embodiments include the component facilitating the award auction (i.e., the Auction Host) determining a winner of an auction bidding sequence and operating with a component of a gaming establishment fund management system (i.e., wagering account host) to credit a gaming establishment account maintained for that identified player, such as a cashless wagering account, the progressive award won by the player placing the winning bid.

Figure 3E:
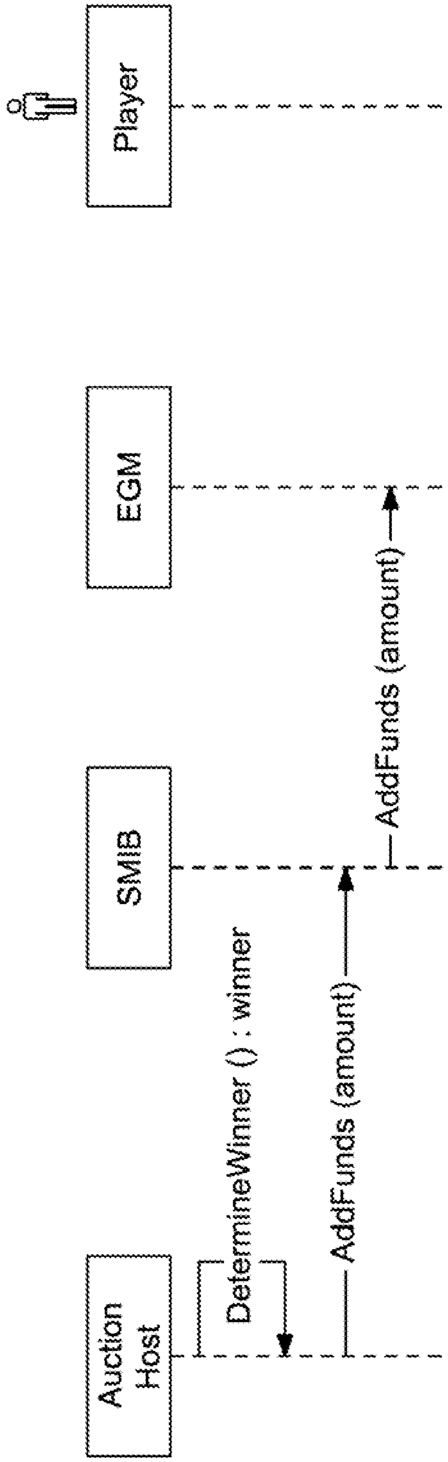

In certain embodiments, independent of whether the identity of the winning player is known, the gaming system operates to add the amount of the progressive award to a credit meter of an EGM. For example, as seen in FIG. 3E (which illustrates the described interactions between a player, an EGM, a component of a gaming establishment patron management system and a component facilitating the award auction), certain embodiments include the component facilitating the award auction (i.e., the Auction Host) determining a winner of an auction bidding sequence and operating with the component of the gaming establishment patron management system (i.e., the SMIB) to add the current value of the progressive award to the credit balance of the EGM using one or more gaming protocols (e.g., SAS and/or G2S protocols). In certain other embodiments in which the progressive award is added to a credit balance of an EGM, the EGM (or a component accessible by the EGM) operates with a component running the auction that operates, directly or indirectly with the EGM, to add the amount of the progressive award to the credit meter of the EGM using one or more gaming protocols (e.g., SAS and/or G2S protocols).

In certain embodiments, if the gaming system determines that a player is a winner of the auction bidding sequence by placing the winning bid, the gaming system directly provides the player the progressive award by crediting an account of the player and/or a credit balance of an EGM being played by that player. In certain embodiments, if the gaming system determines that a player is a winner of the auction bidding sequence by placing the winning bid, the gaming system indirectly provides the player the progressive award by displaying a winning auction presentation sequence. For example, following the gaming system determining a winner of the auction bidding sequence, the gaming system notifies the EGM of the winning player to cause that EGM to hit the progressive award on the next spin, such as by generating a symbol combination associated with the progressive award or providing the progressive award as a mystery bonus independent of any symbols generated for the next spin. That is, the gaming system causes an EGM to proceed to a progressive award triggering event upon a determination of a winner of the auction bidding sequence.

Following the gaming system providing the progressive award associated with the award auction triggering event to the player whom placed the winning bid in the auction bidding sequence, the gaming system determines if a progressive award retirement event has occurred as indicated in diamond 118. In these embodiments, since the award auction offers a way to enable a gaming establishment operator to remove a progressive award without having to wait for an occurrence of a progressive award triggering event, the gaming system determines if such a progressive award retirement event has occurred. That is, rather than waiting for a progressive award triggering event to occur, the gaming system expedites the retirement of that progressive award by initiating an auction bidding sequence for that progressive award. In certain embodiments, the gaming system determines if a progressive award retirement event occurs based on a specified parameter of the award auction, such as an amount of time associated with the progressive award lapsing, at a certain time of day, upon a random event and/or upon an input from an operator.

In certain embodiments in which an auction bidding sequence is employed to retire a progressive award, responsive to an occurrence of an operator initiated award auction triggering event, the gaming system enables a plurality of bids to be placed on the progressive award during an auction bidding sequence, and responsive to one of the plurality of bids determined to be a winning bid, causes the progressive award to be provided to a player associated with the winning bid, and retires the progressive award. In certain such embodiments, the retirement of the progressive award occurs independent of any progressive award triggering event. In certain other embodiments, the retirement of the progressive award comprises disassociating the progressive award from any progressive controller that maintains the progressive award. In certain other embodiments, the retirement of the progressive award responsive to one of the plurality of bids determined to be the winning bid is associated with a first duration and a retirement of the progressive award responsive to an occurrence of a progressive award triggering event is associated with a second, greater duration. In these embodiments, the first duration comprises at least one of a first amount of time and a first quantity of games played and the second, different duration comprises a second, greater amount of time and a second, greater quantity of games played. In certain other embodiments, the retirement of the progressive award occurs prior to any progressive award increment event following the progressive award being provided to the player associated with the winning bid.

In certain embodiments in which an auction bidding sequence is employed to retire a progressive award, the progressive award is associated with an average expected duration of availability based on a probability of an occurrence of a progressive award triggering event. In these embodiments, responsive to an occurrence of an award auction triggering event, independent of the average expected duration of availability associated with the progressive award and following a determination of a winning bid in an auction bidding sequence, the gaming system enables an operator to make an input to retire the progressive award.

If the gaming system determines that no progressive award retirement event has occurred, the gaming system resets the value of the progressive award to the reset value associated with the progressive award as indicated in block 120 of FIG. 1. Following the resetting of the non-retired progressive award, the gaming system returns to block 104 and, as described above, determines if a progressive award increment event has occurred in association with the maintained progressive award.

Figure 3F:
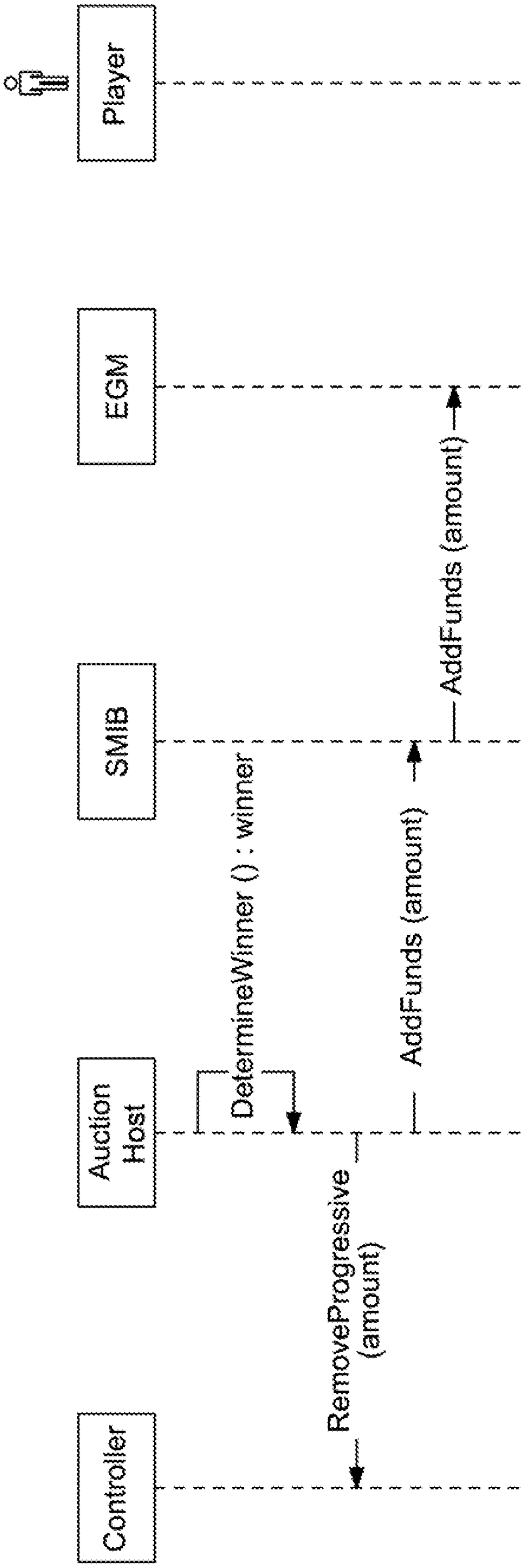

On the other hand, if the gaming system determines that a progressive award retirement event has occurred, the gaming system retires the progressive award as indicated in block 122. In these embodiments, the determination to retire a progressive award includes the removal of the progressive award from any progressive award controller that maintains the progressive award. Such removal after the progressive award has been won offers an operational improvement to the gaming system by enabling a progressive award to be taken offline while staying within the various regulatory requirements associated with progressive awards and when they can be taken offline or otherwise retired. For example, as seen in FIG. 3F (which illustrates the described interactions between a player, an EGM, a component of a gaming establishment patron management system, a component facilitating the award auction and a controller that maintains the progressive award), certain embodiments include the component facilitating the award auction (i.e., the Auction Host) determining a winner of an auction bidding sequence, operating with the component of the gaming establishment patron management system (i.e., the SMIB) to add the current value of the progressive award to the credit balance of the EGM using one or more gaming protocols (e.g., SAS and/or G2S protocols) and then removing the progressive award from the controller that maintains the progressive award.

Figure 3G:
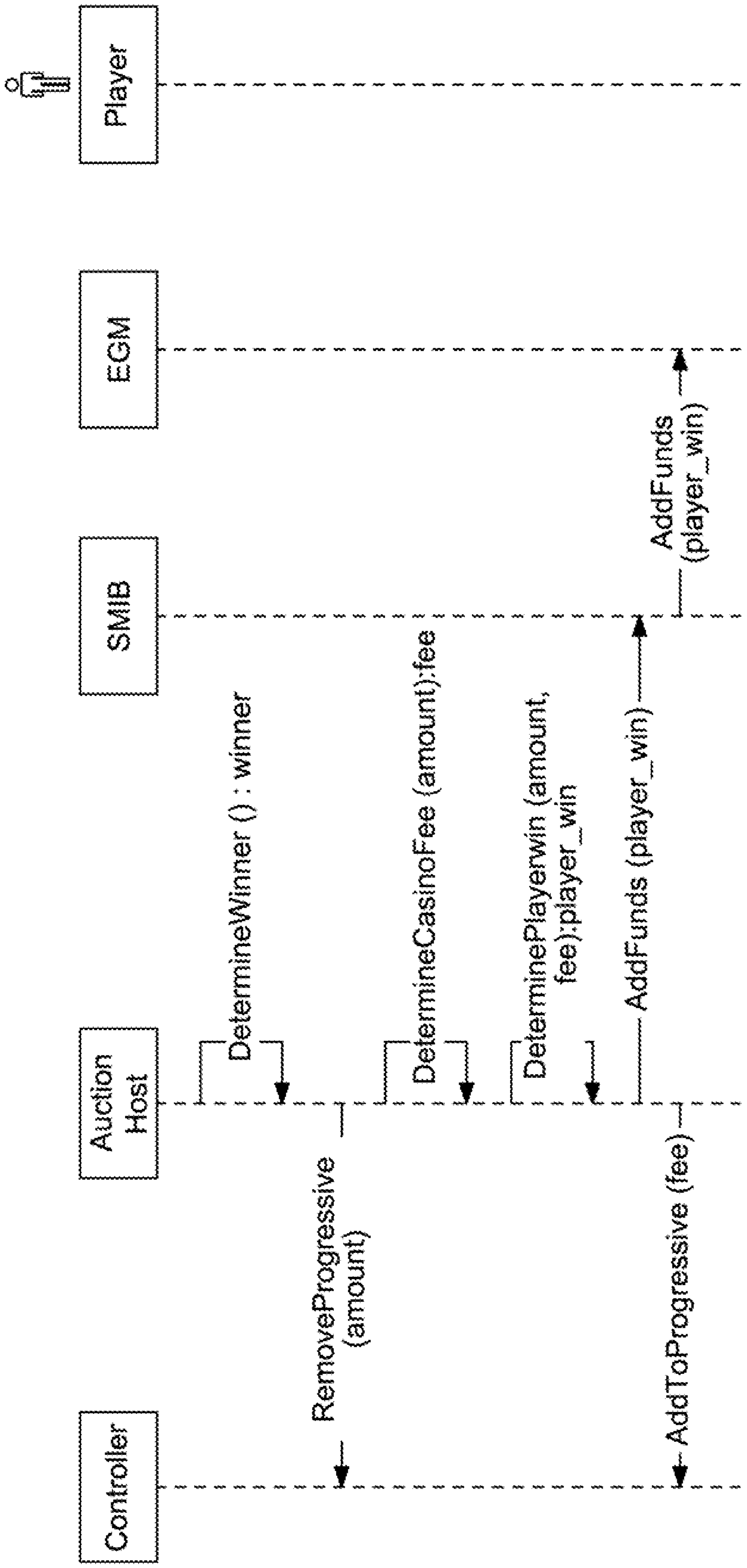

In certain embodiments in which after determining a winning bid on the progressive award being auctioned, the gaming system retains the winning bid and retains part or all of the non-winning bids, the gaming system uses such retained portions (or all) of the non-winning bids to fund another progressive award. In these embodiments, the gaming system utilizes the winning and non-winning bids placed to potentially win one progressive award to fund the growth of another progressive award. For example, as seen in FIG. 3G (which illustrates the described interactions between a player, an EGM, a component of a gaming establishment patron management system, a component facilitating the award auction and a controller that maintains the progressive award), certain embodiments include the component facilitating the award auction (i.e., the Auction Host) determining a winner of an auction bidding sequence, removing the won progressive award from the controller that maintains that progressive award and employs the bids placed during the auction bidding sequence to fund another progressive award. In this example, the component facilitating the award auction additionally operates with the component of the gaming establishment patron management system (i.e., the SMIB) to add the current value of the progressive award to the credit balance of the EGM using one or more gaming protocols (e.g., SAS and/or G2S protocols). It should be appreciated that such an embodiment in which part or all of the bids placed on one progressive award are contributed to another progressive award cause that other progressive award to grow in value quicker which results in potentially higher awards for players and/or higher bids received to fund additional progressive awards.

In certain embodiments in which an auction bidding sequence is employed to fund another progressive award, responsive to an occurrence of an award auction triggering event, the gaming system enables a plurality of bids to be placed on the first progressive award during an auction bidding sequence, wherein a portion of at least one of the plurality of bids funds a second progressive award. In these embodiments, responsive to one of the plurality of bids determined to be a winning bid, the gaming system causes the first progressive award to be provided to a player associated with the winning bid. In certain such embodiments, a portion of each of the plurality of bids fund the second progressive award. In certain other embodiments, the second progressive award comprises the first progressive award after being reset responsive to one of the plurality of bids determined to be the winning bid and/or the second progressive award is different from the first progressive award. In certain embodiments, responsive to one of the plurality of bids determined to be the winning bid, the gaming system allocates different portions of the plurality of bids to fund the second progressive award, such as allocating a first portion of a first bid to fund the second progressive award for a first player having a first status and allocating a second, different portion of a second bid to fund the second progressive award for a second, different player having a second, different status.

In certain embodiments in which an auction bidding sequence is employed to fund another progressive award, responsive to an occurrence of an award auction triggering event, the gaming system enables a plurality of bids to be placed on the first progressive award during an auction bidding sequence. In these embodiments, responsive to one of the plurality of bids determined to be a winning bid, the gaming system causes the first progressive award to be provided to a player associated with the winning bid, and causes a first portion of at least a first bid of the plurality of bids not determined to be the winning bid to fund a second progressive award. In these embodiments, responsive to none of the plurality of bids determined to be the winning bid, the gaming system cause a second portion of at least the first bid to fund the second progressive award. In certain such embodiments, the first portion and/or the second portion comprise different portions, the same portion, no portion or an entire portion of the bid.

Returning to FIG. 1, if the gaming system determines that no award auction triggering event occurred in association with the progressive award (as indicated in diamond 108) or following the occurrence of the award auction triggering event and the determination that there is not a winning bid on the progressive award associated with the award auction triggering event (as indicated in diamond 114), the gaming system determines if a progressive award triggering event has occurred in association with the maintained progressive award as indicated in diamond 124. In certain embodiments, a progressive award triggering event occurs based on one or more displayed events associated with one or more plays of one or more games. In certain embodiments, a progressive award triggering event occurs independent of any displayed events associated with any plays of any games.

If the gaming system determines that no progressive award triggering event occurred in association with the maintained progressive award, the gaming system returns to block 104 and, as described above, determines if a progressive award increment event has occurred in association with the maintained progressive award. For example, if a progressive award triggering event occurs based on the current value of the progressive award reaching a randomly determined progressive award hit value, responsive to a determination that the current value of the progressive award is below the randomly determined progressive award hit value, the gaming system determines that no progressive award triggering event occurred and again determines whether or not to increase the current value of the progressive award based on the occurrence of zero, one or more events. In another example, if a progressive award triggering event occurs based on the determination and display of a symbol (or symbol combination) during a play of a game, responsive to a determination that the symbol (or symbol combination) did not occur during the play of the game, the gaming system determines that no progressive award triggering event occurred and again determines whether or not to increase the current value of the progressive award based on the occurrence of zero, one or more events.

On the other hand, if the gaming system determines that a progressive award triggering event occurred in association with the maintained progressive award, as indicated in block 116, the gaming system causes the maintained progressive award to be provided (to the player associated with the occurrence of the progressive award triggering event) and proceeds, as described above, in determining whether or not a progressive award retirement event has occurred. In different embodiments, the gaming system causes the progressive award to be provided or otherwise made available via any of the above-described funding options such as, but not limited to, an increase of a credit meter of an EGM, a handpay by gaming establishment personnel of the current value of the progressive award, and an increase of a balance of an account, such as a cashless wagering account, associated with a player.

It should be appreciated that any players whom win the progressive award via the auction bidding sequence obtain the progressive award independent of any progressive award triggering event. That is, while the same progressive award is available via an award auction and via an occurrence of a progressive award triggering event, in certain instances, obtaining the progressive award via the award auction offers a more direct route to the progressive award that bypasses the potentially infrequence occurrences of the progressive award triggering event.

Accordingly, unlike prior gaming systems that operated in a static mode of operation in which an award, such as a progressive award, is only available responsive to an award triggering event, the gaming system of the present disclosure employs various modes of operation by offering a plurality of avenues to obtain an award including obtaining an award via an award auction bidding sequence independent of any award triggering event. Such a configuration introduces an operational improvement by enabling multiple ways to provide the same award and thus multiple ways to operate the gaming system to dynamically maintain the availability of that award.

In certain embodiments, the progressive award takes one or more forms such as, but not limited to, one or more of: an increasing quantity of monetary credits, an increasing quantity of non-monetary credits, an increasing quantity of promotional credits, an increasing quantity of player tracking points, an increasing modifier, such as an increasing multiplier, an increasing quantity of free plays of one or more games, an increasing quantity of plays of one or more secondary or bonus games, an increasing multiplier of a quantity of free plays of a game, one or more increasing lottery based awards, such as an increasing quantity of lottery or drawing tickets, an increasing wager match for one or more plays of one or more games, an incrementing increase in the average expected payback percentage for one or more plays of one or more games, an increasing comp (e.g., a free dinner, a free night's stay at a hotel), an increasing quantity of bonus credits usable for online play, an increasing multiplier for player tracking points or credits, an increasing quantity of virtual goods associated with the gaming system, and/or an increasing quantity of virtual goods not associated with the gaming system.

In certain embodiments, the progressive award additionally or alternatively includes an increasing quantity of activations of a feature of a game and/or an increasing magnitude of the activation of a feature of a game. In different embodiments, such features include any feature that results in a modification of one or more components, aspects, or elements of one or more subsequent plays of a game, such as the modification of one or more game outcomes of one or more plays of a game (e.g., the symbols evaluated for the play(s) of the game), the modification of the paytable utilized for one or more plays of the game and/or the modification of any award determined for one or more plays of the game. In different embodiments, such features include, but are not limited to: a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a modifier, such as a multiplier, feature; a book-end wild symbols feature; a stacked wild symbols feature; an expanding wild symbols feature; a nudging wild symbols feature; a feature modifying a quantity of wild symbols available to be generated; a retrigger symbol feature; an anti-terminator symbol feature; a locking reel feature; an expanding reel feature; a locking symbol position feature; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects of one or more games (e.g., colors, speeds, sound) are displayed to a player; and/or a feature modifying any game play feature associated with any play of any game of the present disclosure.

It should be appreciated that while generally described as an award auction triggering event occurring in association with a specific award, such as a specific level of an MLP configuration, such an award auction triggering event may additionally or alternatively occur in association with a plurality of awards, such as multiple levels (or each level) of an MLP configuration. It should be further appreciated that while generally described as the auction bidding sequence being for a progressive award, the auction bidding sequence may additionally or alternatively be for any non-progressive award.

In different embodiments, as described above, a progressive award increment event, an award auction triggering event, an auction bidding sequence termination event, a progressive award triggering event, a progressive award retirement event, and/or a progressive award reset event occurs based on an outcome associated with one or more plays of any primary games or any secondary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game (and/or a secondary game) causes such conditions to be satisfied and/or one or more of such events to occur.

In different embodiments, the gaming system does not provide any apparent reasons to the players for an occurrence of a progressive award increment event, an award auction triggering event, an auction bidding sequence termination event, a progressive award triggering event, and/or a progressive award reset event. In these embodiments, such determinations are not triggered by an event in a primary game or based specifically on any of the plays of any primary games or any secondary games. That is, these events occur without any explanation or alternatively with simple explanations.

In one such embodiment, a progressive award increment event, an award auction triggering event, an auction bidding sequence termination event, a progressive award triggering event, a progressive award retirement event, and/or a progressive award reset event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a progressive award increment event, an award auction triggering event, an auction bidding sequence termination event, a progressive award triggering event, a progressive award retirement event, and/or a progressive award reset event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a progressive award increment event, an award auction triggering event, an auction bidding sequence termination event, a progressive award triggering event, a progressive award retirement event, and/or a progressive award reset event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a progressive award increment event, an award auction triggering event, an auction bidding sequence termination event, a progressive award triggering event, a progressive award retirement event, and/or a progressive award reset event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a progressive award increment event, an award auction triggering event, an auction bidding sequence termination event, a progressive award triggering event, a progressive award retirement event, and/or a progressive award reset event occurs based on a predefined variable reaching a defined parameter threshold. For example, when a quantity of players have played an EGM (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute a predetermined amount), a number of gaming devices active, or any other parameter that defines a suitable threshold.

In different embodiments, a progressive award increment event, an award auction triggering event, an auction bidding sequence termination event, a progressive award triggering event, a progressive award retirement event, and/or a progressive award reset event occurs based on a quantity of games played. In this embodiment, a quantity of games played is set for when one or more of such events or conditions will occur. In one embodiment, such a set quantity of games played is based on historic data.

In different embodiments, a progressive award increment event, an award auction triggering event, an auction bidding sequence termination event, a progressive award triggering event, a progressive award retirement event, and/or a progressive award reset event occurs based on time. In this embodiment, a time is set for when one or more of such events or conditions will occur. In one embodiment, such a set time is based on historic data.

In different embodiments, a progressive award increment event, an award auction triggering event, an auction bidding sequence termination event, a progressive award triggering event, a progressive award retirement event, and/or a progressive award reset event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM and/or logs into the player tracking system using a mobile device, such as a personal gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a progressive award increment event, an award auction triggering event, an auction bidding sequence termination event, a progressive award triggering event, a progressive award retirement event, and/or a progressive award reset event occurs based on a system determination, including one or more random selections by the central controller. For example, as described above, the gaming system tracks all active EGMs and the wagers they placed, wherein based on the EGM's state as well as one or more wager pools associated with the EGM, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a progressive award increment event, an award auction triggering event, an auction bidding sequence termination event, a progressive award triggering event, a progressive award retirement event, and/or a progressive award reset event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur.

It should be appreciated that any suitable manner of causing a progressive award increment event, an award auction triggering event, an auction bidding sequence termination event, a progressive award triggering event, a progressive award retirement event, and/or a progressive award reset event to occur may be implemented in accordance with the gaming system and method of the present disclosure. It should be further appreciated that one or more of the above-described triggers pertaining to a progressive award increment event, an award auction triggering event, an auction bidding sequence termination event, a progressive award triggering event, a progressive award retirement event, and/or a progressive award reset event occurring may be combined in one or more different embodiments.

It should be appreciated that in different embodiments, one or more of:

i. when a progressive award increment event, an award auction triggering event, an auction bidding sequence termination event, a progressive award triggering event, a progressive award retirement event, and/or a progressive award reset event occurs;

ii. a frequency which a progressive award increment event, an award auction triggering event, an auction bidding sequence termination event, a progressive award triggering event, a progressive award retirement event, and/or a progressive award reset event occur;

iii. one or more parameters of one or more progressive awards to be auctioned off;
iv. a quantity of maintained progressive awards;
V. a reset value associated with a progressive award;
vi. a progressive award contribution rate associated with one or more progressive awards; and/or
vii. any determination of the present disclosure;

is/are predetermined, randomly determined, randomly determined based on one or more weighted percentages, determined based on a symbol or symbol combination, determined independent of any symbols or symbol combinations, determined based on a random determination by a server, determined independent of a random determination by a server, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 4:
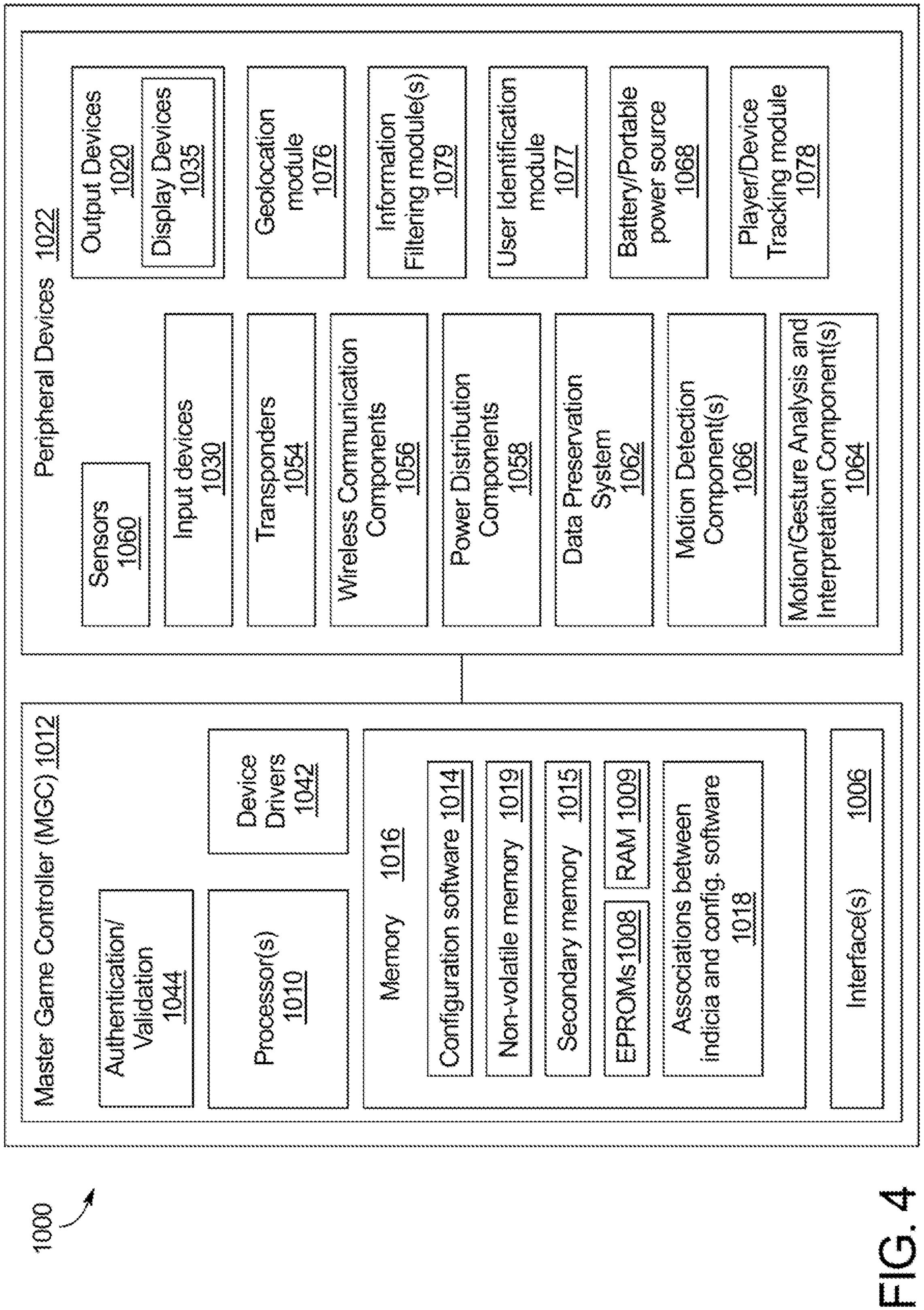
FIG. 4 is a schematic block diagram of one embodiment of an electronic configuration of an example electronic gaming machine of the present disclosure.
Figure 5A:
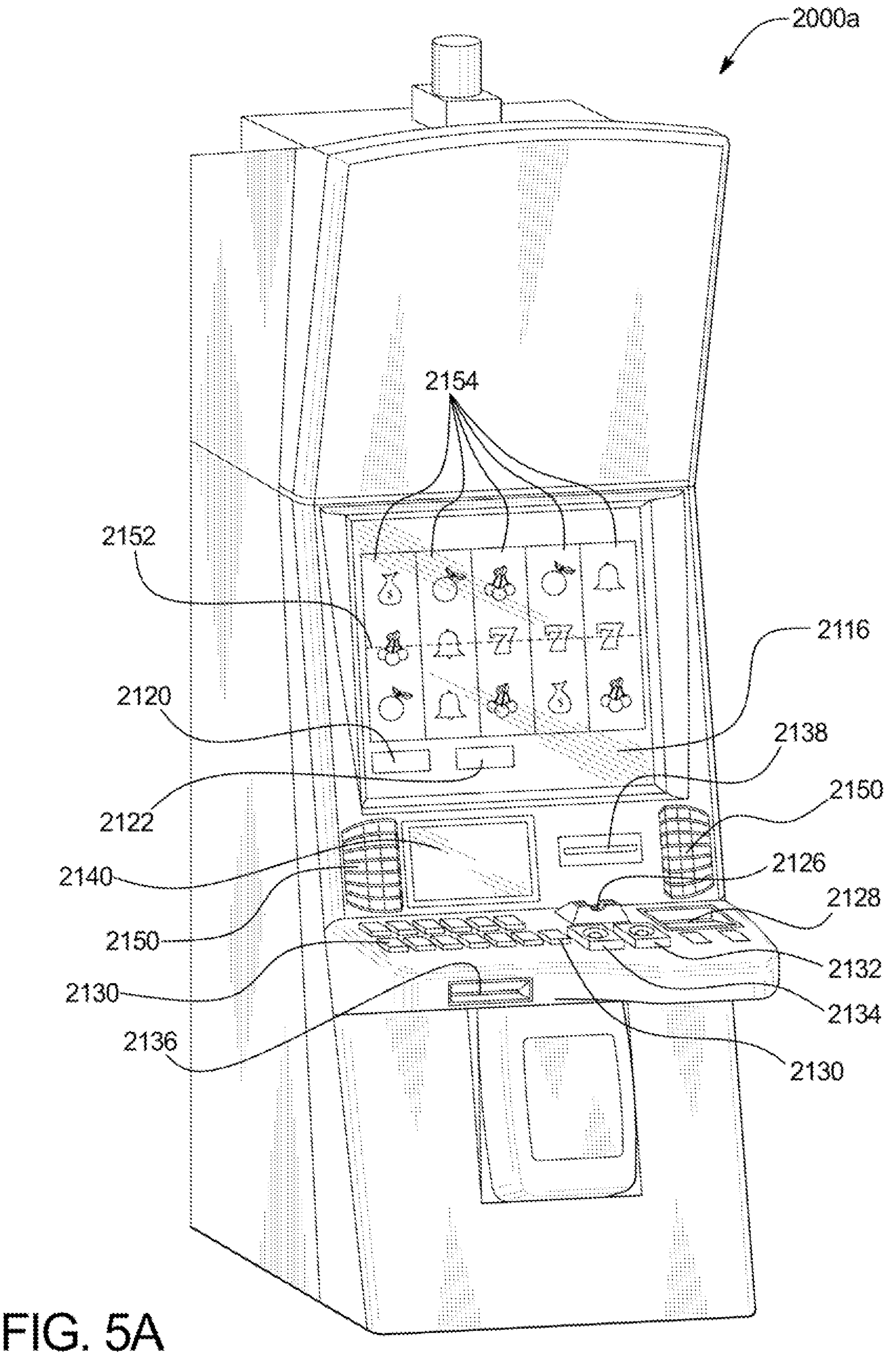
FIGS. 5A and 5B are perspective views of example alternative embodiments of an electronic gaming machine of the present disclosure.
Figure 5B:
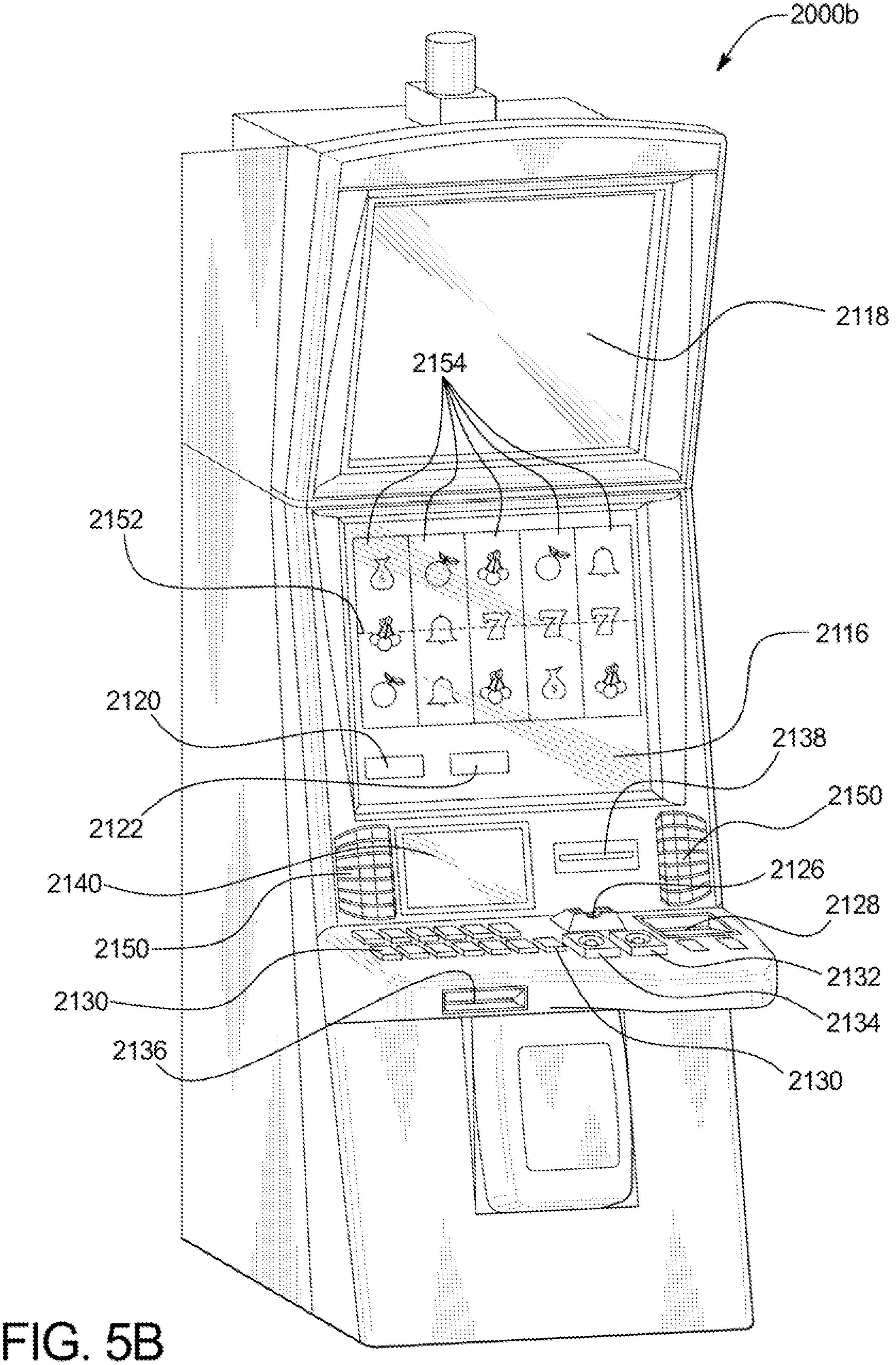
Figure 5C:
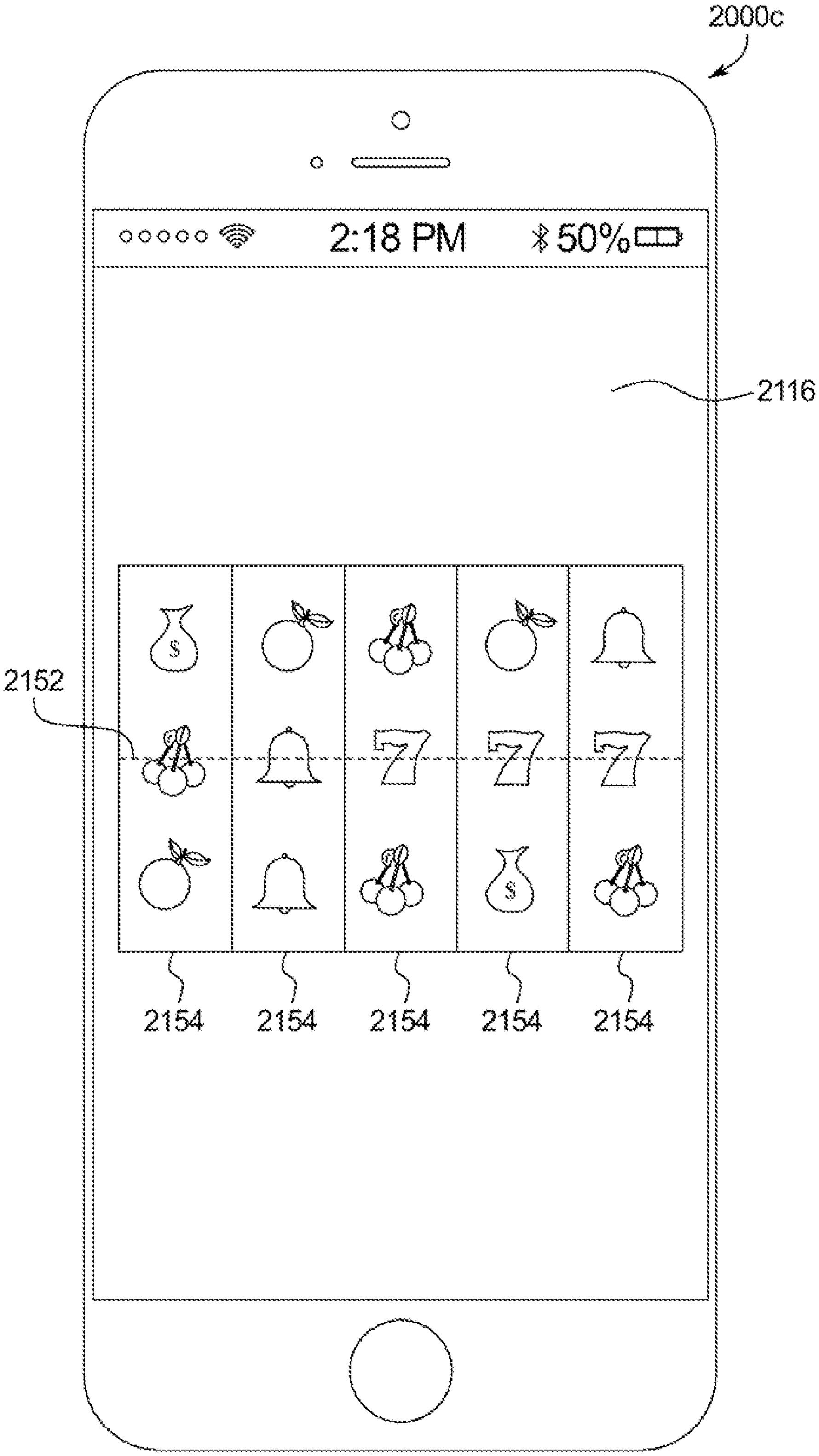
FIG. 5C is a front view of an example personal gaming device of the present disclosure.

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 5C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication-EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:

a processor, and a memory device that stores a plurality of instructions that, when executed by the processor, cause the processor to:

cause a display, by a display device of an electronic gaming machine, of a first progressive award, and responsive to an occurrence of an award auction triggering event:

cause a display, by the display device of the electronic gaming machine, of an auction bidding sequence associated with the first progressive award in which a portion of at least one a the plurality of bids placed during the auction bidding sequence funds a second progressive award, responsive to a receipt of data associated with an opening of an access door of the electronic gaming machine being detected via a security monitoring circuit of the electronic gaming machine during the auction bidding sequence:

disable the electronic gaming machine from placing any bids on the first progressive award during the auction bidding sequence, and following a receipt of data associated with at least a closing of the access door of the electronic gaming machine detected via the security monitoring circuit of the electronic gaming machine, enable the electronic gaming machine to bid on the first progressive award during the auction bidding sequence, and responsive to one of the plurality of bids determined to be a winning bid, take, independent of any occurrence of any progressive award triggering event, the first progressive award prematurely offline by causing the first progressive award to be provided, independent of any probability-based determination, in association with the winning bid.

2. The system of claim 1, wherein a portion of each of the plurality of bids fund the second progressive award.

3. The system of claim 1, wherein the second progressive award comprises the first progressive award after being reset responsive to one of the plurality of bids determined to be the winning bid.

4. The system of claim 1, wherein the second progressive award is different from the first progressive award.

5. The system of claim 1, wherein the memory device stores a plurality of further instructions that, when executed by the processor responsive to one of the plurality of bids determined to be the winning bid, cause the processor to allocate different portions of the plurality of bids to fund the second progressive award.

6. The system of claim 5, wherein a first portion of a first bid is allocated to fund the second progressive award for a first player having a first status and a second, different portion of a second bid is allocated to fund the second progressive award for a second, different player having a second, different status.

7. The system of claim 1, wherein the memory device stores a plurality of further instructions that, when executed by the processor responsive to none of the plurality of bids determined to be the winning bid and an occurrence of a progressive award triggering event, cause the processor to cause the first progressive award to be provided independent of the auction bidding sequence.

8. The system of claim 1, wherein the award auction triggering event occurs responsive to a request to auction the first progressive award and a determination to approve the request.

9. The system of claim 8, wherein the determination to approve the request is based on a status of a player making the request.

10. The system of claim 1, wherein the auction bidding sequence is associated with at least one of a minimum quantity of bids, a minimum quantity of players placing bids, a minimum winning bid, and a maximum winning bid below a threshold amount.

11. A system comprising:

a processor; and a memory device that stores a plurality of instructions that, when executed by the processor, cause the processor to:

cause a display, by a display device of an electronic gaming machine, of a first progressive award, and responsive to an occurrence of an award auction triggering event:

cause a display, by the display device of the electronic gaming machine, of an auction bidding sequence associated with a plurality of bids placed on the first progressive award, responsive to a receipt of data associated with an opening of an access door of the electronic gaming machine being detected via a security monitoring circuit of the electronic gaming machine during the auction bidding sequence:

disable the electronic gaming machine from placing any bids on the first progressive award during the auction bidding sequence, and following a receipt of data associated with at least a closing of the access door of the electronic gaming machine detected via the security monitoring circuit of the electronic gaming machine, enable the electronic gaming machine to bid on the first progressive award during the auction bidding sequence, responsive to one of the plurality of bids determined to be a winning bid:

take, independent of any occurrence of any progressive award triggering event, the first progressive award prematurely offline by causing the first progressive award to be provided, independent of any probability-based determination, in association with the winning bid, and cause a first portion of at least a first bid of the plurality of bids not determined to be the winning bid to fund a second progressive award, and responsive to none of the plurality of bids determined to be the winning bid, cause a second portion of at least the first bid to fund the second progressive award.

12. The system of claim 11, wherein the second portion comprises no portion.

13. The system of claim 11, wherein the second portion comprises an entire portion.

14. The system of claim 11, wherein the first portion is different from the second portion.

15. The system of claim 11, wherein different players are associated with different second portions.

16. The system of claim 11, wherein the first portion comprises an entire portion.

17. The system of claim 11, wherein the memory device stores a plurality of further instructions that, when executed by the processor responsive to none of the plurality of bids determined to be the winning bid and an occurrence of a progressive award triggering event, cause the processor to cause the first progressive award to be provided independent of the auction bidding sequence.

18. The system of claim 11, wherein the award auction triggering event occurs responsive to a request to auction the maintained first progressive award and a determination to approve the request.

19. The system of claim 11, wherein the auction bidding sequence is associated with at least one of a minimum quantity of bids, a minimum quantity of players placing bids, a minimum winning bid, and a maximum winning bid below a threshold amount.

20. A system comprising:

a processor; and a memory device that stores a plurality of instructions that, when executed by the processor, cause the processor to:

cause a display, by a display device of an electronic gaming machine, of a first progressive award, responsive to a first occurrence of a progressive award triggering event prior to an occurrence of an award auction triggering event, cause the first progressive award to be provided in association with the first occurrence of the progressive award triggering event, and responsive to an occurrence of the award auction triggering event prior to any occurrence of the progressive award triggering event:

responsive to a receipt of data associated with an opening of an access door of the electronic gaming machine being detected via a security monitoring circuit of the electronic gaming machine during an auction bidding sequence in which a plurality of bids are placed on the first progressive award:

disable the electronic gaming machine from placing any bids on the first progressive award during the auction bidding sequence, and following a receipt of data associated with at least a closing of the access door of the electronic gaming machine detected via the security monitoring circuit of the electronic gaming machine, enable the electronic gaming machine to bid on the first progressive award during the auction bidding sequence, responsive to one of the plurality of bids placed on the first progressive award during the auction bidding sequence determined to be a winning bid:

take, independent of any occurrence of any progressive award triggering event, the first progressive award prematurely offline by causing the first progressive award to be provided, independent of any probability-based determination, in association with the winning bid, wherein during the auction bidding sequence, the progressive award triggering event is disabled from occurring in association with the first progressive award, allocate a first portion of at least one of the plurality of bids to a second progressive award, and responsive to a second occurrence of the progressive award triggering event, cause the second progressive award to be provided in association with the second occurrence of the progressive award triggering event.

21. The system of claim 20, wherein the first portion comprises an entire portion.

* * * * *